United States Patent

Ohmura et al.

[11] Patent Number: 5,846,585
[45] Date of Patent: Dec. 8, 1998

[54] PROCESS FOR INCREASING THE BULK OF FOOD HAVING DECREASED BULK

[75] Inventors: Hisao Ohmura; Tomoko Fukunaga; Naoto Kudo; Yukitaka Tanaka; Naoki Hosoya; Masaru Sakata; Masami Shimizu; Yasumasa Ohki; Manabu Sato; Masanori Komikado; Takao Hibi; Tomohiro Fukita; Daisuke Shiiba, all of Kashima-gun, Japan

[73] Assignee: Kao Corporation, Tokyo, Japan

[21] Appl. No.: 732,442

[22] PCT Filed: Mar. 14, 1996

[86] PCT No.: PCT/JP96/00630

§ 371 Date: Nov. 6, 1996

§ 102(e) Date: Nov. 6, 1996

[87] PCT Pub. No.: WO96/28036

PCT Pub. Date: Sep. 19, 1996

[30] Foreign Application Priority Data

Mar. 14, 1995 [JP] Japan ....................................... 7-53925
Oct. 3, 1998 [JP] Japan .................................... 7-256501

[51] Int. Cl.⁶ .......................... A21D 17/00; A21D 15/00; A21D 15/02; A21D 15/06
[52] U.S. Cl. .......................... 426/241; 426/392; 426/496; 426/497; 426/665
[58] Field of Search .................................... 426/241, 665, 426/496, 392, 242, 497

[56] References Cited

U.S. PATENT DOCUMENTS 3,189,463  6/1965  Jones ......................................... 426/90
5,558,890  10/1994  Brown et al. ............................. 428/94

FOREIGN PATENT DOCUMENTS

69183/91  7/1991  Australia ......................... A21D 8/02

OTHER PUBLICATIONS

Panasonic microwave oven cookbook, matsushita Appliance Company, One Panasonic Way, Seqcaucis, NJ 07094, copyright 1983, 1984, pp. 99–100.

*Primary Examiner*—Mary E. Mosher
*Attorney, Agent, or Firm*—Oblon, Spivak, McClelland, Maier & Neustadt, P.C.

[57] ABSTRACT

The process for increasing the bulk of a food having a decreased bulk in the present invention comprises applying a means of internal vibration heating such as a microwave oven to a food having a decreased bulk, which has been prepared by subjecting a porous food comprising a cereal flour and water, such as breads, to a treatment such as compression, and has maintained the thus decreased bulk. The food of which the bulk has been increased by such a way has a bulk comparable to the one immediately after baking and exhibits excellent taste and feelings during eating.

31 Claims, No Drawings

PROCESS FOR INCREASING THE BULK OF FOOD HAVING DECREASED BULK

BACKGROUND OF THE INVENTION

1. Field of the Invention

The present invention relates to a process for producing a food having a low specific volume and comprising a cereal flour and water, a food produced by this process, a process for producing a food which comprises steps for the production of the above-mentioned food having a low specific volume, and a process for increasing the bulk of the above-mentioned food having a low specific volume. More particularly, the present invention relates to a process for producing the above-mentioned food having a low specific volume which comprises a step of subjecting a porous food comprising a cereal flour and water such as baked breads to a treatment such as compression to thereby decrease the bulk thereof and a step of effecting a means for maintaining the thus decreased bulk. When heated by the process of the present invention comprising using a means of internal vibration heating such as a microwave generator, the food having a low specific volume according to the present invention becomes a food which has a bulk comparable to the one immediately after baking and shows an excellent taste and feelings during eating.

2. Description of the Related Art

In recent years, the dietary life have been Westernized and, accompanied therewith, the consumption of porous foods comprising a cereal flour and water such as breads continues to grow. While, although it was impossible in former times to store breads for a long period of time, attempts have been made to store breads produced as a measure to cope with the unbalanced supply and demand thereof from the viewpoints of quantity, time and place; and proposals with respect to the techniques for the storage thereof have also been provided actively. Among such the storage techniques, storing in a frozen state has become a common practice; in fact, breads once baked and then stored in a frozen state have been supplied to stores selling breads (convenience stores, etc.) and shops in the food service industry serving breads (fast-food shops, restaurants, etc.). In addition, breads are bulky products and, therefore, from such the view point as well, they are costly in their distribution and storage. Thus, there have been also proposed techniques for reducing the specific volume of breads so as to enhance the storability of the breads and, at the same time, to cut down the cost of distribution and storage of the same.

Particular examples of the above-mentioned proposals of techniques relating to the storage of breads are as follows:

(1) A method relating to the processing of cereal products which comprises steps of compressing a baked cereal product containing moisture while maintaining its voided structure and then freezing the product while maintaining the compressed state (U.S. Pat. No. 3,189,463, granted on Jun. 15, 1965, Patentee: W. Bartlett Jones);

(2) A method relating to the processing of breads, etc. which comprises steps of treating a baked product in a pressure pan, dehydrating, compressing and dehydrating again (U.S. Pat. No. 3,4.73,931, granted on Oct. 21, 1969, Patentees: Joseph M. Rispoli et al.);

(3) A method relating to the processing of cereal products which comprises steps of allowing a prepared cereal product to stand at a low temperature until the moisture contained therein and the temperature attain equilibrium, compressing, freezing and freeze-drying (U.S. Pat. No. 3,512,991, granted on May 19, 1970, Patentees: John J. Mancuso, et al.);

(4) A method comprising preparing a bread dough, molding, fermenting and baking, which comprises semi-baking the bread dough (allowing to be a state in which it is shaped but not colored), and degassing and packaging it by allowing to stand in at least partially vacuum (British Patent Laid-Open No. 2,005,980, published on May 2, 1979); and (5) A method for keeping the freshness of breads which comprises starting the freezing of a bread immediately after baking when its surface temperature is 70° C. or above and effecting the treatment for freezing at a given rate (Japanese Patent Laid-Open No. 58-86036, published on May 23, 1983).

The above proposals relating to techniques for the storage of breads also make reference to techniques for restoring, e.g., the form, of the breads to the state immediately after baking, when, e.g., the breads are sold. It is described in, for example, U.S. Pat. No. 3,189,463 that a frozen cereal product is fed into a toaster as such followed by thawing and toasting. While in U.S. Pat. Nos. 3,474,931 and 3,512,991, there is described that when a dehydrated product is moistured, it expands to thereby be restored the original state. Further, in the method described in British Patent Laid-Open No. 2,005,980, a bread dough is stored in the semi-baked state. It is therefore described in the patent document that the dough is baked in an oven. In addition, it is described in Japanese Patent Laid-Open No. 58-86036 that thawing is effected at a temperature of as high as 120° to 240° C. However, it is difficult to say that when the breads which have been processed by the above-mentioned methods after baking or semi-baking and then stored are subjected to such the treatment cited above, their forms, tastes and feelings during eating which were exhibited immediately after the production thereof are restored.

On the other hand, when breads which have been processed after baking and stored are cooked and served for a meal, it is known to heat such the breads by a means of internal vibration heating such as a microwave generator (represented by a microwave oven). However, experience indicates that when cooking or heating of prepared foods is effected with a microwave oven, only a food having an inferior texture and feelings during eating, as compared with foods cooked by a conventional method or foods immediately after cooking, is obtained in some cases. For example, when a common bread is heated with a microwave oven, the bread not only comes to be one having a strong toughness and poor feelings during eating, but also is quickly hardened due to the rapid transpiration of moisture. Although there have been proposed novel compositions of bread materials to cope with this situation, the above-mentioned problems remain unsolved.

In addition, breads suffer from the problem of smells deteriorating their tastes, for example, the alcoholic smell and fermentation smell owing to the alcohol formed in the fermentation process, the retrogradation smell and acid smell caused by changes in the baked bread with the lapse of time, and, further, the stuffy smell inside the crumb which is generated, e.g., in the step of toasting of the breads. In some cases, these smells become conspicuous when, for example, breads which have been frozen are heated in a microwave oven. To propose a bread to be heated by a means of internal vibration heating such as a microwave oven, it is therefore necessary to examine also the problem of the smells deteriorating the taste of the bread.

DISCLOSURE OF THE INVENTION

SUMMARY OF THE INVENTION

An object of the present invention is to provide a food having a decreased bulk which is not bulky (i.e., has a low specific volume) and suitable for storage, and of which the qualities (i.e., bulk, softness and taste) at the time immediately after the preparation can be restored by the heating with the use of a means of internal vibration heating, and a process for producing the same.

Another object of the present invention is to provide a process for producing a food which comprises a step of subjecting a baked porous food such as breads to a treatment for decreasing its bulk and a step of effecting a heat treatment to thereby give a final product at a request of a customer.

Still another object of the present invention is to provide a process for increasing the bulk of the above-mentioned food having a decreased bulk, in other words, restoring or approximating to the size immediately after baking.

According to the present invention, not only the cost of the distribution and storage of porous foods compring a cereal flour and water, such as breads, can be cut down, but also it becomes possible that porous foods, such as breads, having a taste similar to the one immediately after baking and being excellent in feelings during eating, such as softness and solubility in mouth, are available at any time in stores, food service shops, station kiosks, homes, offices, etc.

To achieve the above-mentioned objects, the present inventors have conducted studies on processed foods which are suitable for storage and, by heat treatment, can show qualities comparable to those of porous foods, such as breads, at the time immediately after the preparation, from the viewpoints of both the techniques for processing porous foods comprising a cereal flour and water, and the production materials thereof. As a result, the present inventors have found that a food having a decreased bulk and capable of exhibitng, by heating, the similar qualities as those exhibited in a porous food at the time immediately after the preparation can be obtained by compressing the above-mentioned porous food which has been produced through a heat treatment by a means such as baking under specific conditions, and effecting a means for maintaining its state after the compressive treatment. Further, the present inventors have found that when the above-mentioned porous foods are breads, the restoration of the qualities by heating as described above is improved by adding a specific substance (s) to the materials commonly employed in the production of breads. Furthermore, the present inventors have also studied the means for heating, for increasing the bulk of the above-mentioned food having a decreased bulk. As a result, they have found that microwave generators such as a microwave oven are suitable as the means for heating it. The present invention has been completed based on these findings.

Thus, the present invention relates a process for increasing the bulk of a food having a decreased bulk, which comprises applying a means of internal vibration heating to a food having a decreased bulk, which has been prepared by subjecting a porous food comprising a cereal flour and water and having been treated by heating to a treatment for decreasing its bulk and has maintained the thus decreased bulk.

Further, the present invention relates to a process for producing a food having a decreased bulk which comprises effecting simultaneously or successively a step (a) of subjecting a porous food comprising a cereal flour and water and having been treated by heating to a treatment for decreasing its bulk to thereby give a food having a decreased bulk which is from 0.01 to 0.9 time as large as the bulk of the porous food having been treated by heating, and a step (b) of effecting a means for maintaining the bulk of the food having the thus decreased bulk; and a food having a decreased bulk produced by the process.

Furthermore, the present invention relates to a process for producing a food which comprises a step (a) of subjecting a porous food comprising a cereal flour and water and having been treated by heating to a treatment for decreasing its bulk to thereby give a food having a decreased bulk which is from 0.01 to 0.9 time as large as the bulk of the porous food having been treated by heating, a step (b) of effecting a means for maintaining the bulk of the food having the thus decreased bulk, and a step (d) of applying a means of internal vibration heating to the food having the thus decreased bulk; and a food produced by the process.

In addition, the present invention relates to a food having a decreased bulk and prepared by subjecting a porous food comprising a cereal flour and water and having been treated by heating to a treatment for decreasing its bulk, which has maintained the thus decreased bulk and has a specific volume of from 1.2 to 4.0 $cm^3/g$, and of which the bulk would be increased by applying a means of internal vibration heating.

When the porous food comprising a cereal flour and water and having been treated by heating in the present invention as described above is a bread, it is preferable to use, as the production materials thereof, (1) a cereal flour having an amount of crude protein of 10% by weight or more; (2) a cereal flour and from 2 to 30 parts by weight, per 100 parts by weight of the cereal flour, of a fat and/or oil having a melting point of from 25° to 50° C. and a solid fat content of from 5 to 70% by weight at 10° C., from 5 to 60% by weight at 25° C. and 25% by weight or less at 35° C.; (3) a cereal flour and from 0.5 to 20 parts by weight, calculated in terms of the amount of solid matters and per 100 parts by weight of the cereal flour, of gluten protein; (4) a cereal flour and from 0.5 to 20 parts by weight, calculated in terms of the amount of solid matters and per 100 parts by weight of the cereal flour, of egg white; (5) a cereal flour and from 0.1 to 10 parts by weight, calculated in terms of the amount of solid matters and per 100 parts by weight of the cereal flour, of a lipoprotein(s); or (6) a cereal flour and from 10 to 20,000 activity units, per kg of the cereal flour, of at least one oxidase selected from the group consisting of peroxidases, glucose oxidases, polyphenol oxidases, transglutaminases and lipoxygenases.

In the present invention as described above, the cereal flour usually comprises wheat flour.

The following inventions fall within the scope of the present invention:

(1) A porous, water-containing wheat flour food which is prepared by decreasing the bulk thereof after the heat treatment which is a porous, water-containing wheat flour food characterized in that its bulk is restored by reheating;

(2) A process for producing a porous, water-containing wheat flour food comprising a step of decreasing the bulk of a porous, water-containing wheat flour food having been treated by heating;

(3) A process for producing a porous, water-containing wheat flour food characterized by decreasing the bulk by compressing after or during the heat treatment, and then freezing and restoring the bulk by internal heating;

(4) A process for producing a porous, water-containing wheat flour food characterized by decreasing the bulk by compressing after the heat treatment and, at the same time, freezing, and restoring the bulk by internal heating;

(5) A process for producing a porous, water-containing wheat flour food characterized by cooling once after the heat treatment, decreasing the bulk by compressing and then freezing, and restoring the bulk by internal heating;

(6) A process for producing a porous, water-containing wheat flour food characterized by cooling once after the heat treatment, decreasing the bulk by compressing and, at the same time, freezing, and restoring the bulk by internal heating; and (7) A porous, water-containing wheat flour food which has been compressed so as to decrease its bulk after or during the heat treatment and, after freezing, of which the bulk is restored by internal heating to be taken.

Further scope and applicability of the present invention will become apparent from the detailed description and examples given hereinafter. However, it should be understood that the detailed description and examples, while indicating preferred embodiments of the invention, are given as only examples, since various changes and modifications within the spirit and scope of the invention will become apparent to those skilled in the art from this detailed description and these examples.

DETAILED DESCRIPTION OF THE INVENTION

The "porous food comprising a cereal flour and water and having been treated by heating" in the present invention means, among foods which are prepared by using a cereal flour such as wheat flour as one of the production materials thereof and served after heat treatment, those having a relatively high moisture content and a relatively high rate of the volume of the internal spaces after the heat treatment. The expression "relatively high moisture content" herein generally means that its moisture content is 10% by weight or more based on the total weight of the food after heat treatment. While, the expression "relatively high rate of the volume of the internal spaces" herein generally means that the food after heat treatment has a rate of the volume of the internal spaces of 10% by volume or more. In other words, the "porous food comprising a cereal flour and water and having been treated by heating" as used in the present invention means a food comprising a cereal flour and water as the essential materials and having been prepared by subjecting heat treatment by a means such as baking, in which the gluten protein and starch contained in the cereal flour as the material form skeleton (or shell) portions of a so-called cell structure and the moisture content of this skeleton portions is relatively high.

The porous food comprising a cereal flour and water and having been treated by heating in the present invention contains water in an amount of usually from 10 to 70% by weight, preferably from 20 to 65% by weight, still more preferably from 30 to 60 and particularly preferably from 35 to 60% by weight, based on the total weight of the food. Further, this porous food has spaces of usually from 30 to 95% by volume, preferably from 50 to 90% by volume, based on the total volume thereof. The rate of the volume of the internal spaces means the ratio of the volume of the void portions to the apparent volume of the porous food.

The moisture content of the porous food having been treated by heating is calculated in accordance with the following formula from the weights, after the determination of the weights of the food before and after drying. The weight of the food after drying herein means the weight measured after drying the food at 125° C. for 24 hours.

$$\text{Moisture content (\% by weight)} = \frac{\text{weight before drying (g)} - \text{weight after drying (g)}}{\text{weight before drying (g)}}$$

Specific examples of the porous food comprising a cereal flour and water and having been treated by heating in the present invention include breads such as loafroll breads, bread type rolls, rolls of breads, croissants, rye breads, and sweet buns such as bean-jam buns; cakes such as sponge cakes, pound cakes, pancakes and muffins; steamed buns such as Chinese buns; and confectioneries such as doughnuts, pies, sponge cakes and waffles.

With respect to a food having a relatively low moisture content, once the bulk thereof is decreased, the bulk can be hardly restored. On the other hand, with respect to a food having a relatively low rate of the volume of the internal spaces, the bulk thereof can be scarcely decreased. Therefore, such foods are scarcely become the subjects of the present invention.

The porous food comprising a cereal flour and water and having been treated by heating to be used in the present invention is one produced by a conventional method involving the step of the heat treatment. The heat treatment includes treatments such as roasting, frying, steaming and stir-frying. The porous foods having been treated by heating are not restricted to those which can be taken as such but may be semi-prepared products. When explained in the case of breads as an example, the porous foods include not only products which have been baked to be a state capable of being taken as such, but also semi-baked (state not to be colored) ones. When the porous food having been treated by heating is a semi-baked bread, heat treatment such as baking may be effected in the subsequent step, as will be described hereinafter. The baking or semi-baking of the bread is performed by heating a fermented bread dough in an oven for baking at a temperature of about 150° to 250° C. for 5 to 30 minutes. While, when the porous food is a bun, the heat treatment generally means steaming.

Although the porous food having been treated by heating is usually subjected to a treatment capable of decreasing its bulk, as it is, it may be subjected to the treatment capable of decreasing its bulk after the division (for example, slicing or plucking off) thereof. However, when a means of internal vibration heating is employed as a means for increasing the bulk of the food having a decreased bulk of the present invention, as will be described hereinafter, it is preferable that the vapor generated by the internal vibration heating is not transpired but is included as much as possible in the food having a decreased bulk. When the porous foods having been treated by heating are breads, it is not preferable from this point of view to expose the crumb portion by dividing thereof. Namely, it is preferable that the porous food having been treated by heating to be used in the present invention is one in which the exposure of the crumb portion is minimized. Specially, it is preferable in the present invention to use a bread having a ratio of the crust portion to the total surface area of 70% or more, and it is the most desirable to use the bread having a state (a whole state) after heat treatment.

Although the porous food having been treated by heating may be subjected as such to the treatment for decreasing its bulk in the present invention, it is preferable that the one having been cooled [the step (c)] after heat treatment is subjected to the treatment for decreasing its bulk. Although the method for cooling is not particularly restricted, the method to be usually effected is one in which it is left to stand till it cools to ordinary temperatures (10° to 30° C.).

A preferable example of the cooling method includes a method which comprises rapidly cooling the porous food having been treated by heating without freezing the inside (though the surface layer may be frozen). In general, freezing proceeds from the outside toward the inside by a cooling treatment. Therefore, the rapid freezing may be effected under such conditions that the core is not frozen thereby. More specially, it is preferable to cool a heat-treated porous food having a surface temperature of, e.g., from about 60° to 100° C. under such conditions that the surface temperature is lowered to 10° C. or below within 3 hours after the completion of the heat treatment. The still more preferable cooling conditions are such cooling conditions that the surface temperature of the porous food reaches 10° C. or below, desirably from −20° to 10° C., within 1 hour, desirably within 2 to 30 minutes, after the completion of the heat treatment. The cooling rate in such the case ranges usually from 5° to 50° C./min, preferably from 8° to 20° C./min. A particular means of the rapid cooling includes the one which comprises introducing the porous food which has been treated by heating into a freezer. When a porous food is cooled in a freezer, the core temperature thereof is usually higher by about 10° to 30° C. than the temperature of its surface-layer-portions.

In the present invention, a porous food which has been treated by heating, or which has been treated by heating followed by cooling is subjected to a treatment which can decrease its bulk [the step (a)].

The decrease in bulk is caused by the reduction in the internal void volume and the deformation of the cell structure. Although the preferable extent of the decrease in bulk varies depending on, e.g., the type of the porous food to be treated, the porous food is treated in such a manner as to regulate the volume of the food after the decrease of its bulk to 0.01 to 0.9, preferably 0.1 to 0.9, when the volume of the porous food immediately after the heat treatment is taken as 1, in the present invention. To save the space in the distribution and storage of the food and the cost accompanied thereby, which is one of the objects of the present invention, it is particularly preferable to regulate the above-mentioned volume to 0.1 to 0.50.

While, in the present invention, the specific volume of the food after the decrease of the bulk falls within the range of from 1.2 to 4.0 cm³/g, preferably from 1.2 to 3.0 cm³/g and still more preferably from 1.2 to 2.0 cm³/g. When the specific volume of the food having a decreased bulk according to the present invention falls within this range, the cut of the space in the distribution and storage thereof and that of the cost accompanied thereby are attained, and, in addition, the bulk is well restored when a heat treatment by a means, e.g., a means of internal vibration heating, is effected which is effected so that the food comes to have a state suitale to be taken.

The specific volume in the present invention means a value measured by the conventional method with the use of rapeseeds and calculated in accordance with the following calculation formula.

$$\text{Specific volume (cm}^3\text{/g)} = \frac{\text{volume (cm}^3\text{) of rapeseeds excluded by throwing food thereinto}}{\text{weight (g) of food}}$$

As an example of the means for decreasing the bulk of a porous food comprising a cereal flour and water and having been treated by heating, citation can be made of mechanical compression and a treatment under reduced pressure, and specific examples thereof include pressure compression with the use of a press and a method which comprises resucing the pressure inside a flexible packaging material which involves a porous food therein (vacuum packing system). In addition, it is also possible to use both methods together.

The above-mentioned treatment for decreasing the bulk is preferably effected under such conditions that the length of the porous food having been treated by heating is decreased at a rate of from 0.1 to 100 mm/sec in the direction of the application of the load to the porous food by, e.g., the pressure compression or the reduction of the volume inside the flexible packaging material, and is still more preferably effected under such conditions that it is decreased at a rate of from 1 to 50 mm/sec. When the treatment for decreasing the bulk is effected under such the conditions, its production efficiency is excellent, and it is possible to obtain a food having a decreased bulk according to the present invention which is excellent in structure and appearance.

The bulk of the food having a decreased bulk thus obtained in the above-mentioned step (a) is enlarged when it is left to stand. In the present invention, therefore, a means for maintaining the bulk of the food having a decreased bulk is effected as the step (b). Examples of such the means include freezing and sealing.

In the present invention, the term "freezing" is used in the same meaning as that commonly used. Specially, freezing indicates to freeze the free water in the food. The food having a decreased bulk according to the present invention becomes to a frozen state usually at a temperature of −5° C. or below. In addition, the freezing as used in the present invention involves not only complete freezing but also partial freezing in which only the surface layer portions are frozen, so long as the thus decreased bulk can be maintained thereby. Although the conditions and means for freezing are not particularly restricted, specially, a method in which the food according to the present invention is left to stand in a freezer or contacted indirectly with a cooling medium such as liquid nitrogen is employed. While, when the steps (a) and (b) are effected successively as will be described hereinafter, a device provided with a cooling means is employed and the porous food having been treated by heating may be allowed to become a frozen state by continuously cooling while decreasing the bulk thereof.

In general, freezing [the step (b)] is effected after the treatment for decreasing the bulk [the step (a)] from the viewpoint of the convenience in handling the food. The freezing [the step (b)] may also be effected after the step (a) in succession. In this case, the porous food having been treated by heating is subjected to pressure compression to thereby give a food having a decreased bulk, followed by effecting the cooling for freezing while maintaining the compressed state (without relieving the pressure). Alternatively, the freezing [the step (b)] may be effected before or simultaneously with the step (a). When freezing treatment is effected in the present invention, the subsequent steps may be effected either in such the state that the above-mentioned porous food having been treated by heating (or the food having a decreased bulk) is frozen, or after thawing thereof.

By effecting the freezing treatment, not only it becomes easy to maintain the form of the food having a decreased bulk of the present invention as such, but also the storability of the food becomes excellent. The food of the present invention in the completely frozen state is supplied to customers as a frozen food.

The food having a decreased bulk of the present invention thus produced may be distributed and stored at ordinary temperatures, when freezing treatment is once effected but thawing treatment is effected in the subsequent step, or when it is processed through no freezing step. In recent years, there have been developed various techniques for the distribution and storage of foods at ordinary temperatures. Therefore, such the techniques can be applied to the food having a decreased bulk of the present invention. Although the distribution and storage of a food at ordinary temperatures are inferior in storability to freezing or refrigeration in some cases, the former is advantageous from the viewpoint of the distribution and storage costs since no cooling device is needed therein.

As one of the means for making the food having a decreased bulk of the present invention suitable for the distribution at ordinary temperatures while maintaining its form (in particular, bulk), citation may be made of sealing and closing. That is, the sealing or closing of the food having a decreased bulk may be effected as the step (b) in the present invention. Specially, (1) before the step (a) is effected, the porous food having been treated by heating is packaged and treated so as to be the final product (the food having a decreased bulk) in a sealed state; (2) the porous food having been treated by heating is compressed by using a member serving as the container therefor and then the state at the completion of the compression treatment is maintained; or (3) the food having a decreased bulk is subjected directly to a sealing or closing treatment.

In the case (1), it is recommended to employ the vacuum pack (vacuum packaging) system in which the steps (a) and (b) are performed at the same time. In the case of (2), a rigid container is used as a packaging material and the compression of the porous food is effected with the use of this container [the step (a)] followed by the maintenance of the state after the compression as such [the step (b)] to thereby give the final product.

Further, to conserve the qualities of the food according to the present invention, a treatment which comprises purging the air inside the packaging material with nitrogen gas, carbon dioxide, etc.

Examples of the packaging material to be used include various plastics (polyethylene, polyvinyl chloride, etc.), polystyrene foam, etc., and examples of the forms thereof include a box and a film. They may be either rigid or flexible, depending on the form thereof to be used.

As discussed above, although the process for producing the food having a decreased bulk of the present invention includes essentially the step of obtaining a food having a decreased bulk [the step (a)] and the step comprising a means for maintaining the bulk of the food [the step (b)], it may include other step(s). When freezing is effected as the step (b), for example, a step of packaging may be added after the step (a). In such a case, it is preferable that the packaging treatment is effected under such conditions that the frozen product is not thawed.

It is preferable from the view point of food sanitation to employ the packaging including sealing as described above. In addition, by packaging it, the improvement in the efficiency of handling the final or semi-final product can be attained.

The above-mentioned process for producing a food having a decreased bulk of the present invention involves, for example, the following processes.

Compression→freezing

Compression→freezing→packaging

Compression→packaging→freezing

Compression/freezing

Compression/freezing→packaging

Compression/sealing or closing

Compression/sealing or closing→freezing

Packaging/compression→maintenance of the state as such

Compression/freezing/sealing or closing.

The "compression" herein denotes the step (a), while the "x/y" means that x and y are effected at the same time.

The food having a decreased bulk of the present invention produced as described above is taken after the treatment for increasing (restoring) its bulk. When packaging treatment is effected, the treatment for removing the packaging material is added to the treatment for increasing the bulk. Further, when freezing treatment is effected, thawing treatment is performed either as a part of the treatment for increasing the bulk or separately therefrom.

"To increase (or restore) the bulk" means to heat a food being in such a state that the bulk has been decreased by compression, etc. (including the one of which the bulk is decreased from the inherent state and the one of which the bulk does not attain the inherent level intentionally) so as to give a food being in a puffed-up and hot state.

From the viewpoints of the taste and feelings during eating of the food, it is preferable to effect the heat for increasing the bulk by using a means which can elevate the internal temperature of the food after heating to 40° C. or above, preferably 60° C. or above.

It is preferable to use a means of internal vibration heating as a means for heating the food having a decreased bulk of the present invention. The internal vibration heating is dry-heating, and means that it acts on a substance at the molecular level to vibrate it, thereby causing the generation of heat. The internal vibration heating differs in principle from so-called external heating which is based on the conduction of heat from outside. The bulk of the food having a decreased bulk of the present invention is appropriately enlarged by this means of internal vibration heating.

Specific examples of the means of internal vibration heating include physical means of heating such as magnetic vibration heating, microwave heating, high frequency heating and far infrared heating. Although these means differ from each other in the wavelength of the electromagnetic wave to be generated, they have each such a mechanism that it acts on a substance at the molecular level through the control of the frequency and magnitude of vibration.

A representative example of the device of the internal vibration heating system includes a microwave generator known as a microwave oven. From the viewpoints of the time required for the treatment and uniform heating, it is particularly advantageous to irradiate the food having a decreased bulk of the present invention with a microwave by using such a device. Any of the microwave ovens is usable in the present invention, so long as they are microwave ovens, without distinction of the use thereof, i.e., for domestic use or for business use. Those having an output value of 500 W or 600 W, or output values of both 500 W and 600 W, which are now known in Japan as microwave ovens for domestic use, and those having an output value of 700 to 1,200 W which are used for business use or in Western countries are all usable as the means for heating the food having a decreased bulk of the present invention.

The microwave herein means an electromagnetic wave having a wavelength of from 1 mm to 1 m (300 to 300,000 MHz), generally 2,450 MHz. When a food is irradiated with a microwave, polar low molecules (for example, water) among the molecules constituting the food are vibrated, thus causing the generation of heat. The conditions for the microwave irradiation are not particularly restricted but vary depending on the type and amount of the food which is the subject to be irradiated, temperature, etc. particularly restricted, a manner which comprises As described above, it is the most desirable to use a means of internal vibration heating [the step (d)] to heat the food having a decreased bulk of the present invention so as to increase its volume. However, it is also possible to effect heating by means of external heating [the step (e)] incidentally, after the heating by means of internal vibration heating or simultaneously with the heating. By combining the means of external heating with that of internal vibration heating, a rapid increase (or restoration) in the bulk and a flavoring of a savory taste characteristic to the case where the means of external heating is employed, are achieved. Although the manner of the combination of the means of external heating and that of internal vibration heating is not effecting the heating by means of external heating after the heating by means of internal vibration heating is general. When the food having a decreased bulk of the present invention is a semi-prepared product such as a semi-baked bread, it is preferable to use a means of internal vibration heating together with a means of external heating, as the means of heating for increasing its bulk.

Examples of the means of external heating include means of radiation heating with the use of fire or electric heat, and examples of the devices of external heat system include gridirons and toasters. In addition, examples of the heating devices whereby internal vibration heating and external heating are effected at the same time include far infrared grills and electromagnetic cookers. In the present invention, such a heating device whereby internal vibration heating and external heating are effected at the same time is included in the devices of internal vibration heating system from the view point of the effects thereof.

As described above, the food having a decreased bulk of the present invention has such a characteristic that the bulk thereof can be very favorably increased (restored) by a means of internal vibration heating, in particular, by suffering from the irradiation with a microwave. Namely, when the food having a decreased bulk of the present invention is irradiated with a microwave, heat is generated by the vibration of water molecules existing in the skeleton portions of the cell structure of the food, and, at the same time, the elevation of the vapor pressure is caused by the evaporation of the moisture contained in the voids (cells). As a result, the increase of the bulk of the food having a decreased bulk of the present invention and heating are very advantageously achieved, thus giving a food with excellent feelings during eating. Such behaviors do not arise by using a means of external heating, even though it is a powerful heating means. The reasons therefor are seemingly as follows. Namely, when a means of external heating is employed, the vapor which acts as a promoter for increasing the bulk is eliminated from the surface of the food and, at the same time, the surface of the food is hardened. In addition, when a means of external heating is employed, the effects to the water existing inside of the food (the water at the molecular level) due to heating are poor, and the disintegration of the cell structure may be accelerated by heating in some cases.

In the present invention, vibration is given (at the molecular level) inside, and thus heat is generated in the step of increasing (restoring) the bulk of the food. Thus, when the means of internal vibration heating is employed, not only the void volume of the food having a decreased bulk of the present invention is merely increased and its bulk is expanded, but also it directly vibrates the molecules in the skeleton portions of the cell structure of the food. It is therefore assumed that some changes would occur in the structure of the skeleton portions of the cell structure composed of gluten and starch, in the step of increasing the bulk. As a result, it is considered that the food produced by the process of the present invention [the one produced through the above-mentioned steps (a) and (b) and the heat treatment by a means of internal vibration heating] becomes the one being soft and having a good solubility in mouth, as compared with a porous food comprising a cereal flour and water and having been treated by heating which is a general one not suffering from any treatment for decreasing the bulk, such as compression, and the subsequent heat treatment by a means of internal vibration heating. When the food having a decreased bulk of the present invention is a frozen food, such the behaviors do not arise when mere spontaneous thawing is effected. The free water which has been frozen (ice) merely thaws out into water.

The extent of the increase in the bulk of the food having a decreased bulk due to heating including the one by a means of internal vibration heating widely varies depending on the composition and structure of the food per se and the conditions of the treatment for decreasing the bulk. However, when the volume of the porous food comprising a cereal flour and water and having been treated by heating immediately after the heat treatment (i.e., baking, etc.) or immediately before the treatment for decreasing the bulk is taken as 1, in general, the bulk of usually from about 0.5 to 1.2, preferably from about 0.7 to 1.2, is achieved. Alternatively, when the volume of the food having a decreased bulk according to the present invention is taken as 1, the bulk of usually from about 1.2 to 10.0 is achieved. Needless to say, it is desirable that the proportion of such the increase in the bulk is high since the puffed-up feel of the heated food is elevated. To be recognized the feelings during eating (softness, solubility in mouth) and puffed-up feel which are arised by the heating with a means of internal vibration heating according to the present invention, it is preferable that the ratio of the volume of the food after heating the food having a decreased bulk by the means of internal vibration heating to the volume of the porous food of the present invention (hereinafter sometimes referred to as the restoration ratio) is 0.7 or above. While, the decreasing ratio in the bulk closely relates to the restoration ratio and there is observed a tendency that an excessively large decreasing ratio in the bulk makes the sufficient restoration of the bulk difficult.

The porous food comprising a cereal flour and water and having been treated by heating which would become the food having a decreased bulk of the present invention is one comprising a cereal flour such as wheat flour as the main material, and containing water. In general, such the porous food contains starch, egg, a fat and/or oil, sugar, a milk component, a flavor, an emulsifier, etc., in addition to such the materials. However, the production materials thereof are not particularly restricted.

Those to be commonly used as main and auxiliary materials for the porous food according to the present invention are as follows.

(1) Cereal flours

The cereal flour which is most commonly employed in the present invention is wheat flour. Among wheat flours, strong flour is preferable. In general, use is made of a wheat flour mixture prepared by appropriately blending strong flour with at least one member selected from the group consisting of medium flour, soft flour, special wheat flour and durum wheat flour commonly employed in the preparation of baked products. Particularly, a wheat flour obtained by adding medium flour and/or soft flour to strong flour and having a protein content (an amount of crude protein) of about 10 to 15% is preferably used.

Examples of the cereal flours other than wheat flour include barley flour, rye flour, corn flour, rice flour, soybean flour, etc.

(2) Starches

As the starch, use is made of natural starches such as corn starch, sweet potato starch, potato starch, tapioca starch, wheat starch and rice starch and modified starches such as acid-modified starch, enzymatically modified starch, oxidized starch, dialdehyde starch, crosslinked starch and esterified starch. Pregelatinized starch, starch with a high amylopectin content and starch with a high amylose content are particularly preferable ones for applying to the present invention.

(3) Eggs

As the egg, use is made of various ones such as whole egg, liquid (frozen) egg, liquid yolk, frozen yolk containing sugar, frozen whole egg containing salt, fresh egg white, frozen egg white, egg powder and egg concentrate.

(4) Fats and oils

In the present invention, use is made of one member or two or more members selected depending on the purpose from the group consisting of animal and vegetable fats and oils appropriate for edible use and hardened, transesterified and fractionated products prepared therefrom, etc. Examples of the animal fats and oils include butter, lard, beef tallow and fish oil, while examples of the vegetable fats and oils include safflower oil, olive oil, cotton seed oil, rapeseed oil, coconut oil, palm kernel oil, palm oil, soybean oil and corn oil. Furtnermore, processed fat and oil products such as margarine and shortening, which contain the above-mentioned fats and oils, may also be cited as the examples of the fats and oils to be used in the present invention.

(5) Milk components

Examples of the milk components to be used in the present invention include cow's milks, fresh cream, whole fat condensed milk, defatted condensed milk, natural cheese, process cheese, butter, whole fat milk powder, skim milk powder, whey powder, fermented milk and O/W emulsions such as, mainly, dairy products.

(6) Sugars

Examples of the sugars include sucrose, fructose, glucose and sugar alcohols.

(7) Flavors and the like

In the porous food of the present invention, use may be made of various flavors, spices, sweeteners, seasonings and foods for giving savors such as chocolate and cocoa, as the production material(s) thereof.

(8) Emulsifiers

Examples of the emulsifiers include glycerol fatty acid esters, sorbitan fatty acid esters, polyglycerol fatty acid esters, sucrose fatty acid esters, propylene glycol fatty acid esters and stearyl organic acid esters. It is particularly preferable to use an emulsifier which is at least partly in the form of liquid crystals or a-crystals, since the feelings during eating and appearance of the food according to the present invention produced by heating by a means of internal vibration heating are improved.

(9) Enzymes

As the enzymes, use can be made of various α-amylases, β-amylases, isoamylases and glucoamylases which are marketed, and various marketed proteases.

The general materials of the porous food which is employed as the production material of the food having a decreased bulk of the present invention, comprises a cereal flour and water and has been treated by heating are as described above. When this porous food is a bread, those having the following compositions are preferable form the viewpoints of the increase of the food prepared by decreasing the bulk of the bread in bulk by internal vibration heating and the feelings during eating and taste of the food after the treatment of the internal vibration heating:

(a) One prepared by using a cereal flour and from 55 to 100 parts by weight, per 100 parts by weight of the cereal flour, of water, as the materials for producing the bread;

(b) One prepared by using a cereal flour having an amount of crude protein of 10% by weight or more, as the material for producing the bread;

(c) One prepared by using a cereal flour and from 2 to 30 parts by weight, per 100 parts by weight of the cereal flour, of a fat and/or oil which has a melting point of from 25° to 50° C. and a solid fat content of from 5 to 70% by weight at 10° C., from 5 to 60% by weight at 25° C. and 25% by weight or less at 35° C., as the materials for producing the bread;

(d) One prepared by using a cereal flour and from 0.5 to 20 parts by weight, calculated in terms of the amount of solid matters and per 100 parts by weight of the cereal flour, of gluten protein, as the materials for producing the bread;

(e) One prepared by using a cereal flour and from 0.5 to 20 parts by weight, calculated in terms of the amount of solid matters and per 100 parts by weight of the cereal flour, of egg white, as the materials for producing the bread;

(f) One prepared by using a cereal flour and from 0.1 to 10 parts by weight, calculated in terms of the amount of solid matters and per 100 parts by weight of the cereal flour, of a lipoprotein, as the materials for producing the bread; and (g) One prepared by using a cereal flour and from 10 to 20,000 activity units, per kg of the cereal flour, of at least one oxidase selected from the group consisting of peroxidases, glucose oxidases, polyphenol oxidases, transglutaminases and lipoxygenases, as the materials for producing the bread.

In the bread of the above composition (a), there have been resolved the problems of the deterioration in the appearance, such as cracking, and deformation of the form thereof, such as breakage, which might occur due to the compression of the bread employed as the material thereof in the production of the food having a decreased bulk of the present invention. In addition, when the food having a decreased bulk of the present invention produced by using such a bread is heated by a means of internal vibration heating, it shows a bulk and feelings during eating almost the same as those of a bread immediately after baking.

In the above composition (a), the amount of water ranges from 55 to 100 parts by weight, preferably from 60 to 90 parts by weight and still more preferably from 65 to 85 parts by weight, per 100 parts by weight of the cereal flour.

When a bread is produced in the composition (a) described above, it is preferable to use, further, a water-retaining agent as a material for producing the bread. Use of the water-retaining agent makes it possible to improve the handling characteristics in the production of the bread with the use of a bread dough having a high moisture content. In addition, the water-retaining agent suppresses the excessive transpiration of the moisture in the heating, by the means of internal vibration heating, of the food having a decreased bulk of the present invention which has been produced from such the bread, and thus contributes also to the provision of a food exhibiting a soft feeling during eating. The amount of the water-retaining agent to be used is usually from 0.05 to 10 parts by weight and preferably from 0.1 to 5 parts by weight per 100 parts by weight of the cereal flour.

Examples of the water-retaining agent include substances relating to alga such as agar, carrageenan, sodium alginate and furcellaran; substances relating to beans such as locust bean gum, guar gum, tara gum and tamarind gum; substances relating to saps such as acacia, gum tragacanth and gum karaya; substances relating to microorganisms such as xanthan gum; substances relating to fruits such as pectin; substances relating to cellulose such as carboxymethylcellulose, hydroxyethylcellulose and viscose; proteins such as casein, gelatin and soybean protein; natural starches such as corn starch, sweet potato starch, potato starch, tapioca starch and rice starch; modified starches such as acid-modified starch, enzymatically modified starch, crosslinked starch and esterified starch; substances relating sugars such as cyclodextrin, starch syrup, oligosaccharides, reducing maltose and sorbitol; mannans such as galactomannan and glucomannan; and chitin.

In the present invention, use can be made of one of these water-retaining agents or a mixture of two or more of them. Among these water-retaining agents, those particularly useful in the development of the above-mentioned effects are gum karaya, xanthan gum, gelatin and soybean protein.

The cereal flour employed in the above composition (b) is one having an amount of crude protein of 10% by weight or more, preferably one of from 11.5 to 15% by weight.

When the composition (b) described above is employed, the food having a decreased bulk of the present invention which has been produced by using such the bread shows a bulk almost the same as that of the bread immediately after baking and feelings during eating of a softness and a high solubility in mouth when it is heated by a means of internal vibration heating. Although the reason therefor remains unknown in detail, it is considered that the gelatinization of starch is relatively suppressed owing to the high protein content.

For the achievement the composition (b) in practice, wheat flour is used, and it is preferable to use strong flour as the wheat flour. In addition, it is also preferable to use a wheat flour mixture which comprises mainly strong flour, and also comprises medium flour and/or soft flour, and further uses a special wheat flour for controlling the amount of crude protein. In the composition (b), it is also possible to use, together with the wheat flour, barley flour, rye flour, corn flour, rice flour, soybean flour and the like which are cereal flours other than wheat flour.

The fat and/or oil employed in the composition (c) is one having a melting point of from 25° to 50° C., preferably from 30° to 45° C., and a solid fat content of from 5 to 70% by weight, preferably from 10 to 60% by weight at 10° C., from 5 to 60% by weight, preferably from 5 to 50% by weight at 25° C. and 25% by weight or less, preferably 15% by weight or less at 35° C. The amount of such the fat and/or oil to be used is from 2 to 30 parts by weight, preferably from 3 to 20 parts by weight per 100 parts by weight of the cereal flour.

The type of the fat and/or oil to be used is not particularly restricted, so long as it exhibits the above-mentioned characteristics. As a matter of course, two or more members may be suitably selected from among vegetable fats and oils, animal fats and oils and processed products thereof, and combined so as to exhibit the above-mentioned characteristics.

The food having a decreased bulk of the present invention prepared by using a bread of the composition (c) has such characteristics that the food obtained by heating by a means of internal vibration heating suffers from a little deterioration in the feelings during eating and a little change with the lapse of time in the feelings during eating also after the heating, even when it is stored in a frozen state for a long time. Although most of the details of the behaviors of the fat and/or oil in bread and the reason why such the characteristics appear still remain unknown, it is estimated that they are given since the cell structure is maintained due to the plasticity of the fat and/or oil also under the frozen conditions and also after the heating by the means of internal vibration heating.

In the composition (d), gluten protein is used in an amount of from 0.5 to 20 parts by weight, preferably from 1 to 10 parts by weight, calculated in terms of the amount of solid matters and per 100 parts by weight of the cereal flour.

The bulk of the food having a decreased bulk of the present invention produced by using a bread of the composition (d) is significantly increased when it is heated by a means of internal vibration heating. The effect described above is particularly remarkable when the food having a decreased bulk of the present invention is stored in a frozen state for a long time.

Although it remains unknown in detail the reason why gluten protein exhibits the above-mentioned effect in the present invention, it is estimated that it is exhibited since the gluten protein acts so as to elevate the elasticity of the cell structure.

Examples of the gluten protein to be used herein include active glutens prepared through the drying and powdering treatment of the wheat flour gluten which does not change its properties as protein, and various gluten decomposition products prepared by treating wheat flour gluten with acids or enzymes. In the present invention, use can be made of one of these gluten proteins or a mixture of two or more of them. Among these gluten proteins, those which are particularly useful in the development of the above-mentioned effect are active glutens.

When heated by a means of internal vibration heating, the food having a decreased bulk of the present invention which has been produced by using a bread of the above composition (e) exhibits excellent feelings during eating. In general, the deterioration of the feelings during eating easily occurs when a food is heated by means of internal vibration heating. Regarding bread, such phenomena that the "toughness" of the bread is strengthened and that the bread is quickly hardened due to the transpiration of the moisture even though it remains hot occur. However, the food having a decreased bulk of the present invention produced by using a bread of the composition (e) never shows such poor feelings during eating as described above, when it is heated by a means of internal vibration heating.

Although it remains unknown the reason why egg white exhibits the above-mentioned effect in detail in the present invention, it is estimated that it is exhibited since the egg white contributes to the densification of the gluten network involving the starch therein and the strengthening of the structure.

Now, the egg white to be used in the production of a bread of the above composition (e) will be described.

Egg white includes various ones such as liquid egg white, frozen egg white, powdery egg white, concentrated egg white, heat-resistant egg white, enzymatically digested egg white, egg white albumen, ovalbumin, conalbumin, ovomucoid and ovoglobulin. In the present invention, use can be made of one of them or a mixture of two or more of them. Among the above-described ones, those which are particularly preferable for obtaining the effects of the present invention are powdery egg white and heat-resistant egg white.

The amount of the egg white to be used is from 0.5 to 20 parts by weight, preferably from 1 to 10 parts by weight, calculated in terms of the amount of solid matters and per 100 parts by weight of the cereal flour.

When heated by a means of internal vibration heating, the food having a decreased bulk of the present invention produced by using a bread of the composition (f) exhibits excellent feelings during eating similar to the food having a decreased bulk of the present invention produced by using a bread of the composition (e).

The lipoprotein to be used in the present invention means a complex of a phospholipid with a protein. Such a complex is prepared by adding a phospholipid and a protein to water to effect emulsification, followed by the dehydration. In the present invention, use may be made of the lipoproteins prepared by using the following starting materials, or commercially available ones.

Examples of the phospholipids to be used for the preparation of the lipoproteins include lecithins originating from various plants and animals, and products prepared by purifying, fractionating or enzymatically treating such the lecithins. Among them, lecithins originating from various plants and animals are preferable and soybean lecithin is particularly preferable. On the other hand, examples of the proteins to be used in the preparation of the lipoproteins include water soluble proteins such as albumins originating from egg, milk, wheat flour and serum; casein; salt-soluble globulin; and low molecular weight gelatin.

In the present invention, the amount of the lipoprotein to be used is from 0.1 to 10 parts by weight, preferably from 0.2 to 5 parts by weight, calculated in terms of the amount of solid matters and per 100 parts by weight of the cereal flour. When it falls within this range, the excellent feelings during eating are ensured as described above while exerting no undesirable effect on the handling characteristics, etc. in the production of the bread dough.

The food having a decreased bulk of the present invention produced by using a bread of the above composition (g) is one which is free from the problem of the generation of any stuff smell (acid smell and excessive fermentation smell) which frequently arises when it is heated by a means of internal vibration heating, particularly in the case that the food is a frozen food, and exhibits excellent feelings during eating.

The above-mentioned enzymes usable in the present invention fall into the category of oxidoreductases, and are as follows, specifically.

Peroxidase is an enzyme having such a property that it oxidizes various substances with hydrogen peroxide as the hydrogen receptor.

Glucose oxidase is an enzyme having such a property that it oxidizes specifically glucose into gluconic acid.

Polyphenol oxidase is an enzyme having such a property that it oxidizes monophenols into o-diphenols and further into o-quinones with molecular oxygen.

Transglutaminase is an enzyme having such a property that it transfers an a-glutamyl group in a peptide to another amino acid to thereby form a peptide crosslink.

Lipoxygenase is an enzyme having such a property that it acts on carotene in wheat flour to thereby bleach the wheat flour.

Although these enzymes are available as the commercial products, also they can be produced by publicly known methods.

Among these enzymes, those which are preferable in order to obtain the effects of the present invention are glucose oxidases and transglutaminases, and those which are particularly preferable are glucose oxidases.

In the present invention, the amount of the above-mentioned enzyme to be used is such the amount as to be from 10 to 20,000 activity units, preferably from 10 to 5,000 activity units, per kg of the cereal flour, though it varies depending on the type of the enzyme. When it falls within this range, as described above, the effect of preventing the stuffy smell and the excellent feelings during eating are ensured while exerting no undesirable effect on the handling characteristics, etc. in the production of the bread dough. The activity of each enzyme can be determined by a publicly known method selected by paying attention to the substrate on which it acts.

It is also preferable to use at least one enzyme selected from the group consisting of catalases, pentosenases, amylases and proteases, together with the enzyme as described above.

The above-mentioned enzyme may be added to the materials for the dough composition after the step of the fermentation of the sponge dough, or may be preliminarily mixed with one of the materials for producing the bread, such as fats and oils. However, it is the most desirable to use the above-mentioned enzyme as a material for the sponge dough composition prior to the fermentation of the sponge dough of the bread. Thus, the enzyme exerts such an excellent effect as desired.

When the composition (g) is employed, the structure of the skeleton portions (gluten/starch network) of the cell structure constituted by the bread dough is densified by the action of the enzyme. The bread dough having such the structure can retain a large amount of moisture. As a result, even when it is a dough having such a high moisture content as unexpected usually, the dough can be produced with good handling characteristics.

The technics of the present invention are also applicable to a porous food comprising a cereal flour and water and having been treated by heating which contains an edible filling material. The expression, containing an edible filling material, as used herein involves not only a case where a specific food material is enclosed in a food such as a bread, but also all of the cases where, e.g., a specific food material is sandwiched between foods such as breads; some part of a specific food material is enclosed in a food such as a bread while other part thereof is exposed on the surface thereof; a specific food material is applied or placed onto the surface layer of a food such as a bread; and a specific food material is embedded and scattered in a food such as a bread.

Examples of the edible filling materials for sweet buns include bean jam, jam, cream, chocolate, curry sauce and honey. While when they are classified depending on the types of the food materials, examples of the edible filling materials include the Chinese type [bean jam, mince (meat and vegetable pieces, etc.), various vegetables, fried rice, okonomiyaki (meat and vegetable pancake), takoyaki (octopus and vegetable ball), various noodles (chow mein, spaghetti, etc.), etc.]; the fried food type [various croquettes, cutlet, various fried foods, various tempura (prawn, cuttlefish, potato, pumpkin, etc.), etc.]; the meat type (hamburg steak, putty, sausage, karubi (ribs of beef), grilled chicken, bacon, etc.), the salad type (egg salad, tuna salad, macaroni salad, potato salad, etc.); the seafood type (prawn, crab, octopus, cuttlefish, various fishes, various shellfishes, etc.); the dairy product type [butter, various cheeses (process, natural, etc.), etc.]; the Western food material type (gratin, rice casserole, stew, various sauces, pizza toppings, etc.); and others [corn, seasonings (mayonnaise, ketchup), various mushrooms, various fruits, various nuts, etc.], though they are not restricted thereto. Needless to say, further, it is also possible to use a combination of two or more of them.

In the present invention, the quantitative ratio between the edible filling material and other part is not particularly limited. Further, the above-mentioned edible filling material may be the food material as such, or one having been seasoned and cooked by various methods. The form of the edible filling material may be arbitrary, and, specially, it may be a form of the food material as such, or alternatively it may be, e.g., flattened or cut into pieces.

When, for example, a bread containing an edible filling material, which is one of materials for the production of the food having a decreased bulk of the present invention, is produed, it may be possible to effect a treatment such as the wrapping of the edible filling materials with an edible film, the covering of the edible filling materials with an edible powder, or the application of an aqueous solution of an edible powder onto the edible filling materials, for the purpose of the prevention of the leak of the edible filling materials from the bread dough during baking. Examples of the edible films to be used for this purpose include protein films, polysaccharide films, etc., while examples of the edible powders include various cereal flours including wheat flour, dry bread crumbs, milk powder, etc. Further, it may also be possible to add a polysaccharide or a protein to the edible filling material, thereby being absorbed the moisture, for the purpose of the controll of the amount of the moisture in the edible filling material (for improving the feelings during eating and handling characteristics).

In the production of the porous food containing an edible filling material according to the present invention, the edible filling material may be introduced into the materials other than the edible filling material at any step among various steps such as a mixing step, a dough-molding step, a step after heat treatment such as baking, and a step after heat treatment and cooling or freezing. Alternatively, the edible filling material may be introduced into the food having a decreased bulk at an arbitrary step after the treatment for decreasing the bulk, such as compression.

When the technics of the present invention are applied to the production of a food having a decreased bulk containing an edible filling material, the food obtained by heating it shows a little stuffy smell.

As described above, since porous foods comprising a cereal flour and water and having been treated by heating, such as breads, can be distributed and stored in a such a state that their bulk are decreased according to the technics of the present invention, the cost therefor can be saved. According to the technics of the present invention, furthermore, puffed-up and hot breads etc. having a taste similar to the one immediately after baking can be quickly served at any time in stores, food service shops and homes.

Other features of the present invention will become apparent from the following description with respect to a series of typical embodiments which are given in order to illustrate the invention and are not intended to limit the invention.

EXAMPLES

Example 1

A roll of bread was prepared by using the following materials. Namely, the following materials were weighed and kneaded together. Next, the obtained dough was fermented at 28° C. for 40 minutes and then divided into portions each weighing 40 g. After a bench time of 15 minutes, the dough was molded. After fermentation at 37° C. under a humidity of 85% for 30 minutes, the dough was baked, thus obtaining a roll of bread having a specific volume of 5.10 (cm$^3$/g).

(Composition of roll of bread)

| | |
|---|---|
| strong flour | 100.0 parts by weight |
| yeast | 2.0 |
| yeast food | 0.1 |
| sugar | 8.0 |
| sodium chloride | 1.8 |
| skim milk powder | 3.0 |
| shortening | 5.0 |
| monoglyceride | 0.3 |
| water | 60.0 |

The roll of bread thus obtained was sandwiched between compression press plates and subjected to compression molding for 15 seconds so as to give the specific volume of the roll of bread of 2.00 cm$^3$/g. The roll of bread after the compression molding was frozen as such, i.e., being sandwiched between the compression press plates, by rapidly cooling to −30° C. Next, the roll of bread was relieved from the press plates and introduced into a packaging film. The air in the packaging film was purged with nitrogen gas, and then the film was sealed. The roll of bread was stored in this state in a freezer. After 1 month, the sealed roll of bread was taken out from the freezer. The roll of bread was taken out from the packaging film, and was heated in a microwave oven (500 W) for 40 seconds. The specific volume of the roll of bread thus obtained was 5.80 cm$^3$/g. The roll of bread thus obtained (i.e., the reheated one) was in a puffed-up and hot state similar to the one just prepared (i.e., immediately after baking) and excellent also in taste and feelings during eating.

Example 2

By using the sponge and main dough materials of the compositions as specified below, a hemispherical loaf bread was produced by the sponge and dough method.

More particularly, the following sponge dough materials were weighed and the mixture thus obtained was subjected to a low speed mixing for 3 minutes and a moderate speed mixing for 1 minute. The dough thus obtained was fermented in a fermentation room at 27° C. under a humidity of 80% for 3 hours. Thus, a sponge dough was obtained.

Next, the main dough materials listed below other than shortening were added to this sponge dough and the mixture thus obtained was subjected to a low speed mixing for 2 minutes and a moderate speed mixing for 3 minutes. Shortening was added thereto, and the obtained mixture was further subjected to a low speed mixing for 4 minutes and a moderate speed mixing for 5 minutes. The dough thus obtained was divided into portions each weighing 50 g. After a bench time of 20 minutes, the doughes thus divided were molded into hemispherical loaves. After fermenting in a fermentation room at 38° C. under a humidity of 85% for 50 minutes, the doughes were baked in a reel oven at 210° C. for 9 minutes to thereby give hemispherical loaf breads having a specific volume of 5.60 cm³/g.
(Composition of hemispherical loaf bread)

| Sponge dough materials | |
| --- | --- |
| strong flour | 70.0 parts by weight |
| yeast | 2.0 |
| yeast food | 0.1 |
| monoglyceride | 0.3 |
| water | 43.0 |
| Main dough materials | |
| strong flour | 30.0 parts by weight |
| sugar | 5.0 |
| sodium chloride | 1.8 |
| egg | 5.0 |
| skim milk powder | 2.0 |
| shortening | 8.0 |
| water | 24.0 |

The hemispherical loaf breads thus obtained were sandwiched between compression press plates and subjected to compression molding for 5 seconds manually so as to give the specific volume of the hemispherical loaf breads of 1.80 cm³/g. The hemispherical loaf breads after the compression molding were rapidly cooled to −30° C. as such, i.e., being sandwiched between the compression press plates. The hemispherical loaf breads were stored at −30° C. until the hemispherical loaf breads were frozen and the compression-molded state was established. Next, the hemispherical loaf breads were relieved from the press plates and introduced into packaging films, followed by sealing the films.

Separately, the hemispherical loaf breads after baking were frozen as such, i.e., without being compressed, under the same conditions as those described above. The hemispherical loaf breads thus frozen were introduced into packaging films, followed by sealing the packaging films.

These hemispherical loaf breads were stored in a freezer in this state. After 24 hours (treatments 1 to 4) or 3 weeks (treatments 5 to 8), the sealed hemispherical loaf breads were taken out from the freezer. The hemispherical loaf breads were taken out from the packaging films and subjected to the following treatments.

Treatment 1: After storing in a frozen state for 24 hours, the compression molded, frozen bread was heated in a microwave oven (500 W).

Treatment 2: After storing in a frozen state for 24 hours, the compression molded, frozen bread was heated in a grill toaster (200° C.).

Treatment 3: After storing in a frozen state for 24 hours, the compression molded, frozen bread was spontaneously thawed at room temperature (26° C.).

Treatment 4: After storing in a frozen state for 24 hours, the frozen bread, which had not been compressed, was heated in a microwave oven (500 W).

Treatment 5: After storing in a frozen state for 3 weeks, the compression molded, frozen bread was heated in a microwave oven (500 W). Treatment 6: After storing in a frozen state for 3 weeks, the compression molded, frozen bread was heated in a grill toaster (200° C.).

Treatment 7: After storing in a frozen state for 3 weeks, the compression molded, frozen bread was spontaneously thawed at room temperature (26° C.).

Treatment 8: After storing in a frozen state for 3 weeks, the frozen bread, which had not been compressed, was heated in a microwave oven (500 W).

Tables 1 and 2 show the specific volumes of the hemispherical loaf breads after heating.

Further, the hemispherical loaf breads after heating were evaluated in taste, feeling during eating and appearance. The results are also given in Tables 1 and 2. The evaluation was organoleptically made by 5 skilled panelists, and the general comments of the panelists are given in the tables (the same will be applied also to the following Examples).

In the tables, ○ means good, Δ means somewhat poor and x means poor. Particular remarks to individuals are also given together therewith in the tables.

TABLE 1

| | Treatment 1 | Treatment 2 | Treatment 3 | Treatment 4 |
| --- | --- | --- | --- | --- |
| specific volume before heating (cm³/g) | 1.80 | 1.80 | 1.80 | 5.60 |
| specific volume after heating (cm³/g) | 5.49 | 2.66 | 3.70 | 5.44 |
| taste | ○ | ○ | Δ no smell | ○ |
| feeling during eating | ○ | Δ | ○~Δ | ○~Δ |
| softness | ○ | entirely hard | partly hard | partly hard |
| appearance | ○ | Δ entirely wrinkled | ○~Δ partly wrinkled | ○ |
| time of cooking (heating in microwave oven) (sec) | 50 | 50 | 1800 | 50 |

TABLE 2

| | Treatment 5 | Treatment 6 | Treatment 7 | Treatment 8 |
| --- | --- | --- | --- | --- |
| specific volume before heating (cm³/g) | 1.80 | 1.80 | 1.80 | 5.60 |
| specific volume after heating (cm³/g) | 5.44 | 2.46 | 3.55 | 5.18 |
| taste | ○ | ○ | Δ no smell | ○ |
| feeling during eating | ○ | Δ~x | ○~Δ | Δ |
| softness | | entirely hard | partly hard | partly hard |
| appearance | ○ | Δ entirely wrinkled | ○~Δ partly wrinkled | ○ |
| time of cooking (heating in microwave oven) (sec) | 50 | 50 | 1800 | 50 |

As Tables 1 and 2 indicate, when heated by using a microwave oven, the hemispherical loaf bread having been compression molded and frozen showed a specific volume comparable to the one immediately after baking and satisfactory taste, feeling during eating and appearance. The microwave oven is much superior to the toaster as a means for increasing (restoring) the bulk of the compressed, frozen bread (the bread having a decreased bulk) according to the present invention. Further, when the bulk had been decreased (compression and freezing were effected after baking), as compared with the case that the bulk had not been decreased (freezing was merely effected after baking), the bread exhibited softness and a high solubility in mouth after heating with a microwave oven. It has been understood that these effects achieved by the present invention are exhibited without deterioration even after a prolonged storage in a frozen state.

Example 3

A ring doughnut was produced by using the following materials by the sponge and dough method.

More particularly, a dough was kneaded, fermented, divided and molded under the conditions as specified below, followed by frying in salad oil at 180° C. for 1 minute and 30 seconds for each side. Thus a ring doughnut having a specific volume of 5.5 cm$^3$/g was prepared.

(Composition of ring doughnut)

| Sponge dough materials | |
| --- | --- |
| wheat flour (strong flour) | 70.0 parts by weight |
| yeast | 3.0 |
| yeast food | 0.1 |
| whole egg | 10.0 |
| monoglyceride | 0.3 |
| water | 35.0 |
| Main dough materials | |
| wheat flour (strong flour) | 30.0 parts by weight |
| sugar | 12.0 |
| sodium chloride | 1.6 |
| skim milk powder | 2.0 |
| shortening | 10.0 |
| baking powder | 1.0 |
| water | 20.0 |

(Production condition)

| Step of the production of sponge dough | |
| --- | --- |
| Mixing: | 3 minutes at low speed, 3 minutes at moderate speed |
| Kneading temp.: | 24.0° C. |
| Fermentation condition: | 28° C., 3 hours |
| Step of the production of main dough | |
| Mixing: | (before adding shortening) 3 minutes at low speed, 3 minutes at moderate speed (after adding shortening) 2 minutes at low speed, 3 minutes at moderate speed, 2 minutes at high speed |
| Kneading temp.: | 27.5° C. |
| Floor time: | 30 minutes |
| Division: | 40 g |
| Bench time: | 20 minutes |
| Fermentation: | 38° C., humidity 70%, 40 minutes |

The ring doughnut thus obtained was introduced into a packaging film. By using a vacuum sealing device, the air in the packaging film was purged with nitrogen gas, and then the vacuum compression of the doughnut and the sealing of the packaging film were effected at the same time under the condition of reduced pressure of 45%. As a result, the specific volume of the doughnut was reduced to 1.80 cm$^3$/g.

The doughnut was frozen as such by rapidly cooling to −30° C. and then stored in a freezer. After 1 month, the doughnut was taken out from the freezer. The doughnut was taken out from the packaging film, and heated in a microwave oven for 40 seconds. As a result, the doughnut expanded to thereby show a specific volume of 5.50 cm$^3$/g. The ring doughnut thus obtained (i.e., reheated) was in a puffed-up state similar to the one just prepared (i.e., immediately after frying) and excellent also in taste and feelings during eating.

Examples 4 to 7

By using the sponge and main dough materials as listed in Table 3, miniloaf breads of Examples 4 to 7 were produced by the sponge and dough method.

More particularly, the sponge dough materials were weighed and the mixture thus obtained was subjected to a low speed mixing for 3 minutes and a moderate speed mixing for 1 minute. The kneading temperature of this dough was 24° C. The dough thus obtained was fermented in a fermentation room at 27° C. under a humidity of 80% for 3 hours. Thus, a sponge dough was obtained.

Next, the main dough materials other than shortening were added to this sponge dough and the mixture thus obtained was subjected to a low speed mixing for 2 minutes and a moderate speed mixing for 3 minutes. Shortening was added thereto, and the obtained mixture was further subjected to a low speed mixing for 3 minutes and a moderate speed mixing for 5 minutes. The kneading temperature of this dough was 27.5° C. After a floor time of 30 minutes, the dough thus obtained was divided into portions each weighing 50 g. After a bench time of 20 minutes, the dough thus divided was molded into a miniloaf. After fermenting in a fermentation room at 38° C. under a humidity of 85% for 50 minutes, the dough was baked in a reel oven at 210° C. for 9 minutes to thereby give a miniloaf bread.

The miniloaf bread thus obtained was sandwiched between compression press plates and subjected to compression molding at a travelling speed of the press plate of 10 mm/sec to thereby give the specific volume of the miniloaf bread of 1.50 cm$^3$/g. The miniloaf bread after the compression molding was rapidly cooled to −30° C. as such, i.e., being sandwiched between the compression press plates. The miniloaf bread was stored at −30° C. until the miniloaf bread was frozen and the compression-molded state was established. Next, the miniloaf bread was relieved from the press plates and introduced into a packaging film, followed by sealing the film. The miniloaf bread was stored in a freezer in this state. After 1 month, the sealed miniloaf bread was taken out from the freezer. The miniloaf bread was taken out from the packaging film and heated with a microwave oven (600 W) for 50 seconds.

Table 3 shows the specific volumes of the miniloaf breads determined before the compression molding (immediately after baking), after the compression molding and immediately after heating with the microwave oven, and the results of the evaluations of the taste, feeling during eating and appearance of the miniloaf breads after heating with the microwave oven.

As Table 3 indicates, when heated by using a microwave oven, the miniloaf breads having been compression molded and frozen had excellent qualities of almost similar to those immediately after baking. Among them, when 65 parts by weight or more, per 100 parts by weight of wheat flour, of water was used, in particular, they were in a puffed-up state and both the taste and feeling during eating were excellent.

TABLE 3

| | (unit: part by weight) Ex. No. | | | |
| --- | --- | --- | --- | --- |
| | 4 | 5 | 6 | 7 |
| <Sponge dough materials> | | | | |
| strong flour | 70.0 | 70.0 | 70.0 | 70.0 |
| yeast | 2.0 | 2.0 | 2.0 | 2.0 |
| yeast food | 0.1 | 0.1 | 0.1 | 0.1 |
| monoglyceride | 0.3 | 0.3 | 0.3 | 0.3 |
| water | 40.0 | 40.0 | 40.0 | 40.0 |
| <Main dough materials> | | | | |
| strong flour | 30.0 | 30.0 | 30.0 | 30.0 |
| sugar | 6.0 | 6.0 | 6.0 | 6.0 |
| sodium chloride | 2.0 | 2.0 | 2.0 | 2.0 |
| skim milk powder | 2.0 | 2.0 | 2.0 | 2.0 |
| egg | 4.0 | 4.0 | 4.0 | 4.0 |
| shortening | 5.0 | 5.0 | 5.0 | 5.0 |
| water | 15.0 | 25.0 | 32.0 | 40.0 |
| specific volume before | 5.45 | 5.84 | 5.86 | 6.14 |

TABLE 3-continued

| | (unit: part by weight) Ex. No. | | | |
|---|---|---|---|---|
| | 4 | 5 | 6 | 7 |
| compression (cm³/g) specific volume after compression (cm³/g) | 1.50 | 1.50 | 1.50 | 1.50 |
| specific volume after heating with microwave oven (cm³/g) | 4.70 | 5.55 | 5.74 | 5.95 |
| taste | Δ~o somewhat weak | o | o | o |
| feeling during eating | Δ~o somewhat hard | o | o | o |
| appearance | Δ~o wrinkled | o | o | o |

Examples 8 to 12

Butter rolls were produced by using, as the wheat flour which is a main material of breads, various wheat flours differing in protein content from one another.

By using the sponge and main dough materials as listed in Table 4, butter rolls of Examples 8 to 12 were produced by the sponge and dough method.

More particularly, the sponge dough materials were weighed and the mixture thus obtained was subjected to a low speed mixing for 3 minutes and a moderate speed mixing for 1 minute. The kneading temperature of this dough was 24.5° C. The dough thus obtained was fermented in a fermentation room at 27° C. under a humidity of 80% for 2.5 hours. Thus, a sponge dough was obtained.

Next, the main dough materials other than shortening and butter fat were added to this sponge dough and the mixture thus obtained was subjected to a low speed mixing for 2 minutes and a moderate speed mixing for 3 minutes. Shortening and butter fat were added thereto, and the obtained mixture was further subjected to a low speed mixing for 3 minutes and a moderate speed mixing for 5 minutes. The kneading temperature of this main dough was 28° C. After a floor time of 15 minutes, the dough thus obtained was divided into portions each weighing 35 g. After a bench time of 20 minutes, the dough thus divided was molded into a form of butter roll. After fermenting in a fermentation room at 38° C. under a humidity of 85% for 50 minutes, the dough was baked in a reel oven at 210° C. for 8 minutes to thereby give a butter roll.

The butter roll thus obtained was sandwiched between compression press plates and subjected to compression molding at a travelling speed of the press plate of 10 mm/sec to thereby give the specific volume of the butter roll of 2.00 cm³/g. The butter roll after the compression molding was rapidly cooled to −30° C. as such, i.e., being sandwiched between the compression press plates. The butter roll was stored at −30° C. until the butter roll was frozen and the compression-molded state was established. Next, the butter roll was relieved from the press plates and introduced into a packaging film, followed by sealing the film. The butter roll was stored in a freezer in this state. After 1 month, the sealed butter roll was taken out from the freezer. The butter roll was taken out from the packaging film and heated with a microwave oven (500 W) for 40 seconds.

Table 4 shows the specific volumes of the butter rolls determined before the compression molding (immediately after baking), after the compression molding and immediately after heating with the microwave oven, and the results of the evaluations of the taste, feeling during eating and appearance of the butter rolls after heating with the microwave oven.

As Table 4 indicates, when heated by using a microwave oven, the butter rolls having been compression molded and frozen had excellent qualities of almost similar to those immediately after baking. Among them, when wheat flours each having an amount of crude protein of 12% by weight or more were used, in particular, they were in a puffed-up state and both the taste and feeling during eating were excellent.

TABLE 4

| | (unit: part by weight) Ex. No. | | | | |
|---|---|---|---|---|---|
| | 8 | 9 | 10 | 11 | 12 |
| <Sponge dough materials> | | | | | |
| wheat flour strong flour*¹ | 70.0 | 70.0 | 70.0 | 50.0 | 50.0 |
| medium flour*² | | | | | |
| soft flour*³ | | | | | |
| special wheat flour*⁴ | | | | 20.0 | 20.0 |
| yeast | 2.0 | 2.0 | 2.0 | 2.0 | 2.0 |
| yeast food | 0.1 | 0.1 | 0.1 | 0.1 | 0.1 |
| monoglyceride | 0.3 | 0.3 | 0.3 | 0.3 | 0.3 |
| water | 40.0 | 40.0 | 40.0 | 40.0 | 40.0 |
| <Main dough materials> | | | | | |
| wheat flour strong flour*¹ | 30.0 | 10.0 | 10.0 | 10.0 | |
| medium flour*² | | 20.0 | | | |
| soft flour*³ | | | 20.0 | | 30.0 |
| special wheat flour*⁴ | | | | 20.0 | |
| sugar | 10.0 | 10.0 | 10.0 | 10.0 | 10.0 |
| sodium chloride | 1.8 | 1.8 | 1.8 | 1.8 | 1.8 |
| skim milk powder | 2.0 | 2.0 | 2.0 | 2.0 | 2.0 |
| egg | 10.0 | 10.0 | 10.0 | 10.0 | 10.0 |
| shortening | 2.0 | 2.0 | 2.0 | 2.0 | 2.0 |
| butter fat | 10.0 | 10.0 | 10.0 | 10.0 | 10.0 |
| water | 25.0 | 25.0 | 25.0 | 25.0 | 25.0 |
| amount of crude protein in wheat flour (wt. %) | 13.2 | 12.3 | 11.8 | 14.6 | 12.0 |
| specific volume before compression (cm³/g) | 5.85 | 5.80 | 5.70 | 5.51 | 5.85 |
| specific volume after compression (cm²/g) | 2.00 | 2.00 | 2.00 | 2.00 | 2.00 |
| specific volume after heating with microwave oven (cm²/g) | 5.80 | 5.14 | 4.88 | 5.55 | 5.63 |
| taste | o | o | Δ~o somewhat weak | o | Δ~o somewhat weak |
| feeling during eating | o | o | o | o | o |
| appearance | o | Δ~o wrinkled | Δ~o wrinkled | o | Δ~o wrinkled |

Note)
Strong flour*¹: Million
Medium flour*²: Asahi
Soft flour*³: Violet
Special wheat flour*⁴: Seikei (Aotori)

All of these wheat flours are products manufactured by Nissin Flour Milling Co., Ltd.

Examples 13 to 17

Table rolls were produced by using, as the shortening which is a material for producing breads, the various shortenings differing in melting point and plasticity from one another as shown in Table 5.

By using the sponge and main dough materials as listed in Table 6, table rolls of Examples 13 to 17 were produced by the sponge and dough method.

More particularly, the sponge dough materials were weighed and the mixture thus obtained was subjected to a low speed mixing for 3 minutes and a moderate speed mixing for 1 minute. The kneading temperature of this dough was 24.5° C. The dough thus obtained was fermented in a fermentation room at 27° C. under a humidity of 80% for 2.5 hours. Thus, a sponge dough was obtained.

Next, the main dough materials other than shortening were added to this sponge dough and the mixture thus obtained was subjected to a low speed mixing for 2 minutes and a moderate speed mixing for 3 minutes. Shortening was added thereto, and the obtained mixture was further subjected to a low speed mixing for 3 minutes and a moderate speed mixing for 5 minutes. The kneading temperature of this main dough was 28° C. After a floor time of 30 minutes, the dough thus obtained was divided into portions each weighing 50 g. After a bench time of 20 minutes, the dough thus divided was molded into a form of table roll. After fermenting in a fermentation room at 38° C. under a humidity of 85% for 50 minutes, the dough was baked in a reel oven at 210° C. for 10 minutes to thereby give a table roll.

The table roll thus obtained was sandwiched between compression press plates and subjected to compression molding at a travelling speed of the press plate of 10 mm/sec to thereby give the specific volume of the table roll of 1.80 cm$^3$/g. The table roll after the compression molding was rapidly cooled to −30° C. as such, i.e., being sandwiched between the compression press plates. The table roll was stored at −30° C. until the table roll was frozen and the compression-molded state was established. Next, the table roll was relieved from the press plates and introduced into a packaging film, followed by sealing the film. The table roll was stored in a freezer in this state. After 1 month, the sealed table roll was taken out from the freezer. The table roll was taken out from the packaging film and heated with a microwave oven (600 W) for 60 seconds.

Table 6 shows the specific volumes of the table rolls determined before the compression molding (immediately after baking), after the compression molding and immediately after heating with the microwave oven, and the results of the evaluations of the taste, feeling during eating and appearance of the table rolls after heating with the microwave oven.

As Table 6 indicates, when heated by using a microwave oven, the table rolls having been compression molded and frozen had excellent qualities of almost similar to those immediately after baking. Among them, when shortenings each having a melting point of from 30° to 45° C. and a solid fat content of from 10 to 50% by weight at 10° C., from 5 to 40% by weight at 25° C. and 20% by weight or less at 35° C. and showing plasticity were used, in particular, they were in a puffed-up state without cracking and the feeling during eating was excellent.

TABLE 5

|  | melting point (°C.) | Solid fat content (wt. %) | | | |
| --- | --- | --- | --- | --- | --- |
|  |  | 10° C. | 20° C. | 30° C. | 35° C. |
| shortening (1) | 49.0 | 65.7 | 55.7 | 41.5 | 23.9 |
| shortening (2) | 10.8 | 40.2 | 25.1 | 17.3 | 9.4 |
| shortening (3) | 38.1 | 28.8 | 18.1 | 11.8 | 6.8 |
| shortening (4) | 36.8 | 15.4 | 13.2 | 9.2 | 6.8 |
| shortening (5) | 39.5 | 10.2 | 9.4 | 8.7 | 7.1 |

Note)
Every shortening is one prepared by using palm oil, rapeseed oil and hardened products thereof.

TABLE 6

| | (unit: part by weight) Ex. No. | | | | |
| --- | --- | --- | --- | --- | --- |
| | 13 | 14 | 15 | 16 | 17 |
| <Sponge dough materials> | | | | | |
| strong flour | 70.0 | 70.0 | 70.0 | 70.0 | 70.0 |
| yeast | 2.0 | 2.0 | 2.0 | 2.0 | 2.0 |
| yeast food | 0.1 | 0.1 | 0.1 | 0.1 | 0.1 |
| monoglyceride | 0.3 | 0.3 | 0.3 | 0.3 | 0.3 |
| water | 40.0 | 40.0 | 40.0 | 40.0 | 40.0 |
| <Main dough materials> | | | | | |
| strong flour | 30.0 | 30.0 | 30.0 | 30.0 | 30.0 |
| sugar | 10.0 | 10.0 | 10.0 | 10.0 | 10.0 |
| sodium chloride | 1.8 | 1.8 | 1.8 | 1.8 | 1.8 |
| skim milk powder | 2.0 | 2.0 | 2.0 | 2.0 | 2.0 |
| egg | 8.0 | 8.0 | 8.0 | 8.0 | 8.0 |
| shortening (1) | 15.0 | | | | |
| shortening (2) | | 15.0 | | | |
| shortening (3) | | | 15.0 | | |
| shortening (4) | | | | 15.0 | |
| shortening (5) | | | | | 15.0 |
| water | 25.0 | 25.0 | 25.0 | 25.0 | 25.0 |
| specific volume before compression (cm$^3$/g) | 5.10 | 5.65 | 5.74 | 5.90 | 5.84 |
| specific volume after compression (cm$^3$/g) | 1.80 | 1.80 | 1.80 | 1.80 | 1.80 |
| specific volume after heating with microwave oven (cm$^3$/g) | 4.60 | 5.57 | 5.55 | 5.68 | 5.80 |
| taste | o | o | o | o | o |
| feeling during eating | Δ~o somewhat hard | o | o | o | o |
| appearance | Δ~o partly cracked | o | o | o | o |

Examples 18 to 22

Loaf breads were prepared with compositions comprising proteins such as gluten and egg white added to a composition commonly employed for loaf breads.

By using the sponge and main dough materials as listed in Table 7, miniloaf breads of Examples 18 to 22 were produced by the sponge and dough method.

More particularly, the sponge dough materials were weighed and the mixture thus obtained was subjected to a low speed mixing for 2 minutes and a moderate speed mixing for 1 minute. The kneading temperature of this dough was 24° C. The dough thus obtained was fermented in a fermentation room at 27° C. under a humidity of 80% for 3 hours. Thus, a sponge dough was obtained.

Next, the main dough materials other than shortening were added to this sponge dough and the mixture thus obtained was subjected to a low speed mixing for 2 minutes and a moderate speed mixing for 3 minutes. Shortening was added thereto, and the obtained mixture was further subjected to a low speed mixing for 2 minutes and a moderate speed mixing for 5 minutes. The kneading temperature of this main dough was 28° C. After a floor time of 30 minutes, the dough thus obtained was divided into portions each weighing 60 g. After a bench time of 20 minutes, the dough thus divided was molded into a form of miniloaf bread. After fermenting in a fermentation room at 38° C. under a humidity of 85% for 50 minutes, the dough was baked in a reel oven at 210° C. for 10 minutes to thereby give a miniloaf bread.

The miniloaf bread thus obtained was sandwiched between compression press plates and subjected to compression molding at a travelling speed of the press plate of 10 mm/sec to thereby give the specific volume of the miniloaf bread of 1.50 cm³/g. The miniloaf bread after the compression molding was rapidly cooled to −30° C. as such, i.e., being sandwiched between the compression press plates. The miniloaf bread was stored at −30° C. until the miniloaf bread was frozen and the compression-molded state was established. Next, the miniloaf bread was relieved from the press plates and introduced into a packaging film, followed by sealing the film. The miniloaf bread was stored in a freezer in this state. After 3 months, the sealed miniloaf bread was taken out from the freezer. The miniloaf bread was taken out from the packaging film and heated with a microwave oven (600 W) for 60 seconds.

Table 7 shows the specific volumes of the miniloaf breads determined before the compression molding (immediately after baking), after the compression molding and immediately after heating with the microwave oven, and the results of the evaluations of the taste, feeling during eating and appearance of the miniloaf breads after heating with the microwave oven.

As Table 7 indicates, when heated by using a microwave oven, the miniloaf breads having been compression molded and frozen expanded well and showed a good taste and feeling during eating almost similar to those immediately after baking, though they had been stored for a long time in a frozed state. Among them, those in which egg white was added showed particularly excellent qualities.

TABLE 7

| | (unit: part by weight) Ex. No. | | | | |
|---|---|---|---|---|---|
| | 18 | 19 | 20 | 21 | 22 |
| <Sponge dough materials> | | | | | |
| strong flour*¹ | 70.0 | 70.0 | 70.0 | 70.0 | 70.0 |
| wheat flour gluten*² | 3.0 | | | | 3.0 |
| decomposed gluten*² | | 3.0 | | | |
| powdery egg white*⁴ | | | 3.0 | | 3.0 |
| lipoprotein | | | | 2.0 | |
| yeast | 2.0 | 2.0 | 2.0 | 2.0 | 2.0 |
| yeast food | 0.1 | 0.1 | 0.1 | 0.1 | 0.1 |
| monoglyceride | 0.3 | 0.3 | 0.3 | 0.3 | 0.3 |
| water | 40.0 | 40.0 | 40.0 | 40.0 | 40.0 |
| <Main dough materials> | | | | | |
| strong flour | 30.0 | 30.0 | 30.0 | 30.0 | 30.0 |
| sugar | 5.0 | 5.0 | 5.0 | 5.0 | 5.0 |
| sodium chloride | 1.8 | 1.8 | 1.8 | 1.8 | 1.8 |
| skim milk powder | 2.0 | 2.0 | 2.0 | 2.0 | 2.0 |
| egg | 5.0 | 5.0 | 5.0 | 5.0 | 5.0 |
| shortening | 5.0 | 5.0 | 5.0 | 5.0 | 5.0 |
| water | 25.0 | 25.0 | 25.0 | 25.0 | 25.0 |
| specific volume before compression (cm²/g) | 5.05 | 5.35 | 5.86 | 5.75 | 5.60 |
| specific volume after compression (cm²/g) | 1.50 | 1.50 | 1.50 | 1.50 | 1.50 |
| specific volume after heating with microwave oven (cm³/g) | 5.00 | 5.20 | 5.50 | 5.64 | 5.55 |
| taste | o | Δ~o some stuffy smell | o | o | o |
| feeling during eating | Δ~o somewhat hard | o | o | o | o |
| appearance | o | o | o | Δ~o partly wrinkled | o |

TABLE 7-continued

| | (unit: part by weight) Ex. No. | | | | |
|---|---|---|---|---|---|
| | 18 | 19 | 20 | 21 | 22 |

Note)
Wheat flour gluten*¹: Gluten EX-100 (mfd. by Riken Vitamin Co., Ltd.), the values given in the table are those calculated in terms of solid matters.
Decomposed gluten*²: Glupearl 30 (mfd. by Katayama Kagaku, K.K.), the value given in the table is one calculated in terms of solid matters.
Powdery egg white*³: Ranpaku Funmatsu KM (mfd. by Taiyo Kagaku Co., Ltd.), the value given in the table is one calculated in terms of solid matters.
Lipoprotein*⁴: one prepared from whey protein and lecithin, the value given in the table is one calculated in terms of solid matters.

Examples 23 to 28

Loaf breads were prepared with compositions comprising enzymes added to a composition commonly employed for loaf breads.

By using the sponge and main dough materials as listed in Table 8, miniloaf breads of Examples 23 to 28 were produced by the sponge and dough method.

More particularly, the sponge dough materials were weighed and the mixture thus obtained was subjected to a low speed mixing for 2 minutes and a moderate speed mixing for 1 minute. The kneading temperature of this dough was 23° C. The dough thus obtained was fermented in a fermentation room at 27° C. under a humidity of 70% for 3.5 hours. Thus, a sponge dough was obtained.

Next, the main dough materials other than shortening were added to this sponge dough and the mixture thus obtained was subjected to a low speed mixing for 3 minutes and a moderate speed mixing for 3 minutes. Shortening was added thereto, and the obtained mixture was further subjected to a low speed mixing for 2 minutes, a moderate speed mixing for 3 minutes and a high speed mixing for 3 minutes. The kneading temperature of this main dough was 27.5° C. After a floor time of 20 minutes, the dough thus obtained was divided into portions each weighing 60 g. After a bench time of 20 minutes, the dough thus divided was molded into a form of miniloaf bread. After fermenting in a fermentation room at 38° C. under a humidity of 80% for 50 minutes, the dough was baked in a reel oven at 220° C. for 10 minutes to thereby give a miniloaf bread.

The miniloaf bread thus obtained was sandwiched between compression press plates and subjected to compression molding at a travelling speed of the press plate of 10 mm/sec to thereby give the specific volume of the miniloaf bread of 1.50 cm³/g. The miniloaf bread after the compression molding was rapidly cooled to −30° C. as such, i.e., being sandwiched between the compression press plates. The miniloaf bread was stored at −30° C. until the miniloaf bread was frozen and the compression-molded state was established. Next, the miniloaf bread was relieved from the press plates and introduced into a packaging film, followed by sealing the film. The miniloaf bread was stored in a freezer in this state. After 1 month, the sealed miniloaf bread was taken out from the freezer. The miniloaf bread was taken out from the packaging film and heated with a microwave oven (600 W) for 50 seconds.

Table 8 shows the specific volumes of the miniloaf breads determined before the compression molding (immediately after baking), after the compression molding and immediately after heating with the microwave oven, and the results of the evaluations of the taste, feeling during eating and appearance of the miniloaf breads after heating with the microwave oven.

As Table 8 indicates, when heated by using a microwave oven, the miniloaf breads having been compression molded and frozen expanded well and showed a good taste and feeling during eating. While, they exhibited neither any acid smell nor excessive fermentation smell.

TABLE 8

| | (unit: part by weight) Ex. No. | | | | | |
|---|---|---|---|---|---|---|
| | 23 | 24 | 25 | 26 | 27 | 28 |
| <Sponge dough materials> | | | | | | |
| strong flour | 70.0 | 70.0 | 70.0 | 70.0 | 70.0 | 70.0 |
| yeast | 2.0 | 2.0 | 2.0 | 2.0 | 2.0 | 2.0 |
| yeast food | 0.1 | 0.1 | 0.1 | 0.1 | 0.1 | 0.1 |
| sugar | 5.0 | 5.0 | 5.0 | 5.0 | 5.0 | 5.0 |
| glucose oxidase* | 45 | 45 | | | 45 | 30 |
| catalase* | | 900 | | | | |
| transglutaminase* | | | 1500 | | | |
| lipoxygenase* | | | | 1000 | | |
| polyphenol oxidase* | | | | | 500 | |
| peroxidase* | | | | | | 500 |
| monoglyceride | 0.3 | 0.3 | 0.3 | 0.3 | 0.3 | 0.3 |
| water | 45.0 | 45.0 | 45.0 | 45.0 | 45.0 | 45.0 |
| <Main dough materials> | | | | | | |
| strong flour | 30.0 | 30.0 | 30.0 | 30.0 | 30.0 | 30.0 |
| sugar | 2.0 | 2.0 | 2.0 | 2.0 | 2.0 | 2.0 |
| sodium chloride | 1.8 | 1.8 | 1.8 | 1.8 | 1.8 | 1.8 |
| skim milk powder | 2.0 | 2.0 | 2.0 | 2.0 | 2.0 | 2.0 |
| egg | 5.0 | 5.0 | 5.0 | 5.0 | 5.0 | 5.0 |
| shortening | 5.0 | 5.0 | 5.0 | 5.0 | 5.0 | 5.0 |
| water | 25.0 | 25.0 | 25.0 | 25.0 | 25.0 | 25.0 |
| specific volume before compression (cm$^3$/g) | 5.25 | 5.82 | 5.33 | 5.40 | 5.35 | 5.55 |
| specific volume after compression (cm$^3$/g) | 1.50 | 1.50 | 1.50 | 1.50 | 1.50 | 1.50 |
| specific volume after heating with microwave oven (cm$^3$g) | 5.03 | 5.64 | 5.15 | 5.02 | 5.04 | 5.50 |
| taste | o | o | o | o | o | o |
| feeling during eating | o | o | o | o | o | o |
| appearance | o | o | o | o | o | o |

Note)
*: The amount of the enzyme is the activity unit of the enzyme/kg of wheat flour.

The activities of the enzymes were measured as follows.
[Method for measuring glucose oxidase activity]

When, using glucose as a substrate, the substrate is acted with a glucose oxidase in the presence of oxygen, hydrogen peroxide is generated. The hydrogen peroxide thus generated is acted with a peroxidase in the presence of aminoantipyridine and phenol. The color tone of the quinoimine dye thus formed is measured at a wavelength of 500 nm to thereby determine the quinoimine dye. The amount of the enzyme required for oxidizing 1 $\mu$mol of glucose (the substrate) in 1 minute under these conditions is taken as 1 unit.

[Catalase]

Use was made of a commercially available product with a clearly indicated enzyme activity, specially Catalase L<Amano>(mfd. by Amano Seiyaku K. K.). [Method for measuring the activity unit of transglutaminase ($\gamma$-glutamyl transferase)]

The amount of the enzyme capable of forming 1 $\mu$mol of p-nitroaniline in 1 minute under the following conditions is taken as 1 unit.

A Tris-hydrochloride buffer solution of pH 8.6 is referred to as the solution A.

A solution which is prepared by adding the solution A to "4.72 g of glycylglycine+1.02 g of MgCl$_2$+1.00 g of L-$\gamma$-glutamyl-p-nitroanilide monohydrate" so as to make up to the volume of 500 ml is referred to as the solution B.

A solution which is prepared by accurately weighing about 12.5 mg of a sample (the enzyme) and adding the solution A thereto so as to make up to the volume of 100 ml is referred to as the solution C. The solution C is stored in a water bath at 25° C.

With respect to each of the two solutions "3.0 ml of the solution B+0.02 ml of the solution C" and "3.0 ml of the solution B+0.02 ml of the solution A", the absorbance at a wave length of 405 nm thereof is measured in accordance with JIS K 0115 (General Rules for Molecular Absorptiometric Analysis) by using water as a control and absorption cells, 10 mm, at 25° C. for 5 minutes immediately after mixing the solution B with the solution C (or the solution A). The changes in absorbance per minute are referred to respectively as E$_1$ and E$_2$. By using the results, the activity A (units/mg) is calculated by the following formula.

$$A = \frac{(E_1 - E_2) \times 3.02 \times 100}{9.9 \times S \times 0.02}$$

wherein,
9.9 corresponds to the millimolar extinction coefficient of p-nitroaniline at 405 nm;
3.02 corresponds to the total liquid volume (ml) of the reaction mixture; and
S means the mass of the enzyme weighed (about 12.5 mg in the above-mentioned case).

[Method for measuring lipoxygenase activity]

The absorption of oxygen due to the double bond in a substrate is measured with Warburg's manometer.

3 ml of a 0.1 mM solution of ammonium linoleate in .0.1M phosphate buffer (pH 7.0) is introduced into a manometer flask, while 0.1 to 0.5 ml of an aqueous solution of lipoxygenase is introduced into the side room of the flask. When both solutions reach 20° C., both solutions are mixed with each other in the atmosphere. The oxygen absorption due to the double bond in the substrate is measured for 30 minutes at intervals of 5 minutes. The amount thereof causing the absorption of 1 $\mu$M of oxygen in 1 minute is taken as 1 unit.

[Method for measuring polyphenol oxidase activity]

The absorption of oxygen due to the double bond in a substrate is measured with Warburg's manometer.

1.5 ml of a 0.05M disodium hydrogen phosphate-0.025M citrate buffer (pH 5.5) and 2.0 ml of a 10 mM solution of d-catechin in ethanol are introduced into a manometer flask, while 0.5 ml of a polyphenol oxidase solution is introduced into the side room of the flask. When the solutions in the manometer flask and the side room reach 27° C., both solutions are mixed with each other in the atmosphere. The oxygen absorption due to the double bond in the substrate is measured for 10 minutes. The amount thereof causing the absorption of 1 $\mu$M of oxygen in 1 minute is taken as 1 unit.

[Method for measuring peroxidase activity]

The activity whereby 1 mg of purpurogallin is formed in a reaction time of 20 seconds is taken as 1 unit.

14 ml of water is introduced into a test tube, and 2 ml of a 0.1M potassium phosphate buffer (pH 6.3) is added thereto. The obtained aqueous solution is maintained to 20° C. The subsequent procedures are all effected at 20° C. Next, 2 ml of an aqueous solution of pyrogallol(5 w/v %) and 2 ml of an aqueous hydrogen peroxide (0.5 w/v %) are added to the above-mentioned aqueous solution. The resulting mixture is shaken, and subsequently 1 ml of a solution of peroxidase is added thereto. Immediately after the addition, the obtained mixture is quickly shaken. After just 20 seconds, 1 ml of 1M sulfuric acid is added thereto followed by shaking. The solution thus obtained is extracted with diethyl ether thrice, the obtained diethyl ether solutions are combined and diethyl ether is further added thereto so as to give a total volume of 100 ml. This solution is referred to as the solution A. The peroxidase solution is prepared by introducing about 25 mg of peroxidase accurately weighed into a 100 ml volumetric flask, making up the volume to 100 ml with a 0.1M potassium phosphate buffer (pH 6.3) and then diluting the obtained solution 10-fold.

Separately, the same treatment as that described above is effected except that a peroxidase solution is not used, to thereby give a diether solution of 100 ml in total volume. This solution is referred to as the solution B.

In accordance with JIS K 0115 (General Rules for Molecular Absorptiometric Analysis), the absorbances at a wave length of 420 nm of the solutions A and B are each measured by using absorption cells, 10 mm, and diethyl ether as the control. Each measurement is effected thrice and the average is determined. Then, the activity A (units/mg) is calculated by the following formula.

$$A = \frac{(E_1 - E_2)}{S} \times 8.5$$

wherein, $E_1$ represents the absorbance of the solution A;

$E_2$ represents the absorbance of the solution B; and

S represents the mass of the peroxidase weighed (about 25 mg in the above-mentioned case).

Examples 29 to 32

Loaf breads were prepared by using a composition commonly employed for loaf breads. The obtained loaf breads were compressed at various compression speeds, i.e., by varying the travelling speed of the press plate, to thereby examine the effects.

By using the sponge and main dough materials as listed in Table 9, miniloaf breads of Examples 29 to 32 were produced by the same method as that in Examples 23 to 28

The miniloaf breads thus obtained were sandwiched between compression press plates and subjected to compression molding while varying the travelling speed of the press plate in a range of from 0.1 to 100 mm/sec to thereby give the specific volume of the miniloaf breads of 1.80 cm³/g. The miniloaf breads after the compression molding were rapidly cooled to −30° C. as such, i.e., being sandwiched between the compression press plates. The miniloaf breads were stored at −30° C. until the miniloaf breads were frozen and the compression-molded states thereof were established. Next, the miniloaf breads were relieved from the press plates and introduced into packaging films, followed by sealing the films. The miniloaf breads were stored in a freezer in these states. After 1 month, the sealed miniloaf breads were taken out from the freezer. The miniloaf breads were taken out from the packaging films and heated with a microwave oven (600 W) for 50 seconds.

Table 9 shows the specific volumes of the miniloaf breads determined before the compression molding (immediately after baking), after the compression molding and immediately after heating with the microwave oven, and the results of the evaluations of the taste, feeling during eating and appearance of the miniloaf breads after heating with the microwave oven.

As Table 9 indicates, when heated by using a microwave oven, the miniloaf breads having been compression molded and frozen expanded well to a level comparable to the one immediately after baking, and showed a good taste and feeling during eating similar to those immediately after baking. When the compression rate was 0.1 mm/sec or below, however, the restoration of the specific volume was poor, and when it was 100 mm/sec or above, on the other hand, the product underwent cracking in the stage of expansion and the appearance thereof had become poor.

TABLE 9

| | (unit: part by weight) Ex. No. | | | |
|---|---|---|---|---|
| | 29 | 30 | 31 | 32 |
| <Sponge dough materials> | | | | |
| strong flour | 70.0 | 70.0 | 70.0 | 70.0 |
| yeast | 2.0 | 2.0 | 2.0 | 2.0 |
| yeast food | 0.1 | 0.1 | 0.1 | 0.1 |
| monoglyceride | 0.3 | 0.3 | 0.3 | 0.3 |
| water | 45.0 | 45.0 | 45.0 | 45.0 |
| <Main dough materials> | | | | |
| strong flour | 30.0 | 30.0 | 30.0 | 30.0 |
| sugar | 2.0 | 2.0 | 2.0 | 2.0 |
| sodium chloride | 1.8 | 1.8 | 1.8 | 1.8 |
| skim milk powder | 2.0 | 2.0 | 2.0 | 2.0 |
| egg | 5.0 | 5.0 | 5.0 | 5.0 |
| shortening | 5.0 | 5.0 | 5.0 | 5.0 |
| water | 25.0 | 25.0 | 25.0 | 25.0 |
| compression rate (travelling speed of compression press plate (mm/sec) | 0.1 | 3.0 | 10.0 | 100.0 |
| specific volume before compression (cm³/g) | 5.66 | 5.60 | 5.65 | 5.70 |
| specific volume after compression (cm³/g) | 1.80 | 1.80 | 1.80 | 1.80 |
| specific volume after heating with microwave oven (cm³/g) | 5.05 | 5.55 | 5.55 | 5.40 |
| taste | o | o | o | o |
| feeling during eating | o | o | o | o |
| appearance | Δ~o somewhat wrinkled | o | o | Δ~o somewhat cracked |

Example 33

Miniloaf breads having a specific volume of 5.60 cm³/g were prepared by using the same materials for producing breads and the same method as those in Examples 29 to 32. The miniloaf breads thus obtained were frozen under the conditions as specified below.

Treatment 1: The bread was cooled to 25° C. over a period of 90 minutes immediately after baking.

Treatment 2: The bread was cooled to 10° C. over a period of 60 minutes immediately after baking.

Treatment 3: The bread was cooled to −5° C. over a period of 30 minutes immediately after baking.

Treatment 4: The bread was cooled to −20° C. over a period of 10 minutes immediately after baking.

Then, these miniloaf breads were sandwiched between compression press plates and subjected to compression molding at a travelling speed of the press plate of 10 mm/sec to thereby give the specific volume of the miniloaf breads of 1.80 cm³/g. The miniloaf breads after the compression molding were rapidly cooled to −30° C. as such, i.e., being sandwiched between the compression press plates. The miniloaf breads were stored at −30° C. until the miniloaf breads were frozen and the compression-molded states thereof were established. Next, the miniloaf breads were relieved from the press plates and introduced into packaging films, followed by sealing the films. The miniloaf breads were stored in a freezer in these states. After 1 month, the sealed miniloaf breads were taken out from the freezer. The miniloaf breads were taken out from the packaging films and heated with a microwave oven (600 W) for 50 seconds.

Table 10 shows the specific volumes of the miniloaf breads determined before the compression molding (immediately after baking), after the compression molding and immediately after heating with the microwave oven, and the results of the evaluations of the taste, feeling during eating and appearance of the miniloaf breads after heating with the microwave oven.

As Table 10 indicates, when heated by using a microwave oven, the miniloaf breads having been compression molded and frozen expanded well to a level comparable to the one immediately after baking, and showed a good taste and feeling during eating similar to those immediately after baking. It has been proved that the performance of the rapid freezing treatment at immediately after baking acts advantageously to the restoration of the specific volume in the step of heating the miniloaf bread having been compression molded with the microwave oven and to the taste and feeling during eating thereof after heating.

TABLE 10

|  | Treatment 1 | Treatment 2 | Treatment 3 | Treatment 4 |
| --- | --- | --- | --- | --- |
| specific volume before compression (cm³/g) | 5.60 | 5.60 | 5.60 | 5.60 |
| specific volume after compression (cm³/g) | 1.80 | 1.80 | 1.80 | 1.80 |
| specific volume after heating with microwave oven (cm³/g) | 4.25 | 4.80 | 5.45 | 5.55 |
| taste | Δ~o somewhat weak | Δ~o somewhat weak | o | o |
| feeling during eating | Δ~o somewhat hard | Δ~o somewhat hard | o | o |
| appearance | Δ~o wrinkled | Δ~o wrinkled | o | o |

Examples 34 to 38

By using the sponge and main dough materials as listed in Table 11, hemispherical loaf breads containing fillings as foods of Examples 34 to 38 were produced by the sponge and dough method.

More particularly, the sponge dough materials were weighed and the mixture thus obtained was subjected to a low speed mixing for 3 minutes and a moderate speed mixing for 1 minute. The dough thus obtained was fermented in a fermentation room at 27° C. under a humidity of 80% for 3 hours. Thus, a sponge dough was obtained.

Next, the main dough materials other than shortening were added to this sponge dough and the mixture thus obtained was subjected to a low speed mixing for 2 minutes and a moderate speed mixing for 3 minutes. Shortening was added thereto, and the obtained mixture was further subjected to a low speed mixing for 4 minutes and a moderate speed mixing for 5 minutes. The dough thus obtained was divided into portions each weighing 50 g. After a bench time of 20 minutes, the following treatments were effected.

Example 34: The dough was topped with cheese chips, which was molded into a hemisphere.

Example 35: The dough was topped with sliced bacon, which was molded into a hemisphere.

Example 36: Curry sauce was wrapped with the dough, which was molded into a hemisphere.

Example 37: Pizza ingredients were wrapped with the dough, which was then molded into a hemisphere.

Example 38: The dough was molded into a hemisphere.

The molded doughes were fermented in a fermentation room at 38° C. under a humidity of 85% for 50 minutes and then baked in a reel oven at 210° C. for 9 minutes to thereby give hemispherical breads.

Next, with respect to Example 38, the bread was cut and a sausage was inserted thereinto.

The specific volumes of these breads are those as show n in Table 11.

The hemispherical breads having fillings thus obtained were sandwiched between compression press plates and subjected to compression molding at a travelling speed of the press plate of 10 mm/sec. The specific volume of each of the breads is one as shown in Table 11. The hemispherical breads having fillings after the compression molding were rapidly cooled to −30° C. as such, i.e., being sandwiched between the compression press plates. The hemispherical breads having fillings were stored at −30° C. until the hemispherical breads having fillings were frozen and the compression-molded states thereof were established. Next, the hemispherical breads having fillings were relieved from the press plates and introduced into packaging films, followed by sealing the films. The hemispherical breads having fillings were stored in a freezer in these states. After 1 month, the sealed hemispherical breads having fillings were taken out from the freezer. The hemispherical breads having fillings were taken out from the packaging films and heated with a microwave oven (600 W) for 60 seconds. The specific volumes of the breads after heating are those as shown in Table 11.

Each of the obtained breads had a puffed-up state and exhibited a good taste in both the filling and bread portions.

TABLE 11

| | (unit: part by weight) Ex. No. | | | | |
| --- | --- | --- | --- | --- | --- |
| | 34 | 35 | 36 | 37 | 38 |
| <Sponge dough materials> | | | | | |
| strong flour | 70.0 | 70.0 | 70.0 | 70.0 | 70.0 |
| yeast | 2.0 | 2.0 | 2.0 | 2.0 | 2.0 |
| yeast food | 0.1 | 0.1 | 0.1 | 0.1 | 0.1 |
| monoglyceride | 0.3 | 0.3 | 0.3 | 0.3 | 0.3 |
| water | 43.0 | 43.0 | 43.0 | 43.0 | 43.0 |
| <Main dough materials> | | | | | |
| strong flour | 30.0 | 30.0 | 30.0 | 30.0 | 30.0 |
| sugar | 7.0 | 7.0 | 7.0 | 7.0 | 7.0 |
| sodium chloride | 1.8 | 1.8 | 1.8 | 1.8 | 1.8 |

TABLE 11-continued

| | (unit: part by weight) Ex. No. | | | | |
|---|---|---|---|---|---|
| | 34 | 35 | 36 | 37 | 38 |
| skim milk powder | 2.0 | 2.0 | 2.0 | 2.0 | 2.0 |
| egg | 5.0 | 5.0 | 5.0 | 5.0 | 5.0 |
| shortening | 10.0 | 10.0 | 10.0 | 10.0 | 10.0 |
| water | 25.0 | 25.0 | 25.0 | 25.0 | 25.0 |
| <Fillings> | | | | | |
| cheese chip | 30.0 | | | | |
| sliced bacon | | 30.0 | | | |
| curry sauce | | | 30.0 | | |
| pizza ingredients | | | | 30.0 | |
| sliced sausage | | | | | 30.0 |
| specific volume before compression (cm³/g) | 4.85 | 4.95 | 4.80 | 4.60 | 4.75 |
| specific volume after compression (cm³/g) | 2.10 | 2.10 | 2.00 | 2.10 | 2.20 |
| specific volume after heating with microwave oven (cm³/g) | 4.85 | 4.80 | 4.55 | 4.55 | 4.50 |

We claim:

1. A process for restoring the bulk of a porous food having decreased bulk, which comprises heating said porous food with microwaves sufficient to produce a restoration ratio of 0.7 or above, wherein said porous food has been subjected to a treatment for decreasing its bulk and maintaining its decreased bulk, and said porous food comprises a cereal flour and water and has been treated by heating prior to the treatment for decreasing its bulk.

2. The process for increasing the bulk of a food having a decreased bulk as claimed in claim 1, wherein the food having a decreased bulk and maintaining the thus decreased bulk has a specific volume of from 1.2 to 4.0 cm³/g and a bulk from 0.01 to 0.5 time as large as the bulk prior to the treatment for decreasing the bulk.

3. The process for increasing the bulk of a food having a decreased bulk as claimed in claim 1, wherein the porous food having been treated by heating is a bread.

4. The process for increasing the bulk of a food having a decreased bulk as claimed in claim 1, wherein the cereal flour comprises wheat flour.

5. The process for increasing the bulk of a food having a decreased bulk as claimed in claim 1, wherein the bulk of the food obtained by applying the means of internal vibration heating is from 1.2 to 10.0 times as large as the bulk of the food having a decreased bulk.

6. The process of claim 1, wherein said food having a decreased bulk is prepared by a process which comprises effecting simultaneously or successively a step (a) of subjecting a porous food comprising a cereal flour and water and having been treated by heating to a treatment for decreasing its bulk to thereby give a food having a decreased bulk which is from 0.01 to 0.5 times as large as the bulk of the porous food having been treated by heating, and a step (b) of effecting a means for maintaining the bulk of the food having the thus decreased bulk.

7. The process as claimed in claim 6, wherein the food having a decreased bulk has a specific volume of from 1.2 to 4.0 cm³/g.

8. The process as claimed in claim 6, wherein the heat treatment is baking or semi-baking.

9. The process as claimed in claim 6, wherein the step (a) comprises decreasing the length of the porous food having been treated by heating at a rate of from 0.1 to 100 mm/sec in the direction of the application of the load in the treatment for decreasing the bulk.

10. The process as claimed in claim 6, wherein the means in the step (b) is freezing.

11. The process as claimed in claim 6, wherein the means in the step (b) is sealing.

12. The process as claimed in claim 6, which further comprises a step (c) of cooling the porous food having been treated by heating which is to be effected prior to the treatment for decreasing the bulk of the porous food having been treated by heating.

13. The process as claimed in claim 12, wherein the step (c) is one in which the surface temperature of the porous food is lowered to 10° C. or below within 3 hours after the completion of the heat treatment.

14. The process as claimed in claim 6, wherein the porous food having been treated by heating has a moisture content of from 30 to 60% by weight.

15. The process as claimed in claim 6, wherein the cereal flour comprises wheat flour.

16. The process of claim 1, wherein said porous food has internal spaces of 50 to 90% by volume, based on the total volume of the porous food.

17. The process of claim 1, wherein said heating with microwaves produces a food having a bulk of 0.7 to 1.2 times the bulk of said porous food.

18. A process for producing a food, which comprises the steps:
 (a) subjecting a porous food to a treatment for decreasing its bulk, wherein said porous food comprises a cereal flour and water and has been treated by heating prior to the treatment for decreasing its bulk,
 (b) effecting a means for maintaining the decreased bulk of the porous food, and having the thus decreased bulk, and a step (d) of,
 (c) heating the porous food with microwaves under conditions sufficient to restore bulk to the food,
 wherein step (a) results in a food which is from 0.01 to 0.9 times the bulk of the original porous food, and wherein step (c) result in restoring at least 0.7 times the orignal bulk.

19. The process for producing a food as claimed in claim 18, wherein the food having a decreased bulk has a specific volume of from 1.2 to 4.0 cm³/g.

20. The process for producing a food as claimed in claim 18, which further comprises a step (d) of applying a means of external heating effected simultaneously with the step (c) or thereafter.

21. The process for producing a food as claimed in claim 18, wherein the cereal flour comprises wheat flour.

22. The process of claim 18, wherein said food having a decreased bulk is prepared by subjecting a porous food comprising a cereal flour and water and having been treated by heating to a treatment for decreasing its bulk, which has maintained the thus decreased bulk and has a specific volume of 1.2 to 4.0 cm³/g.

23. The process as claimed in claim 22, wherein the porous food having been treated by heating is a bread.

24. The process as claimed in claim 23, wherein the bread has a crust portion amounting to 70% or more on the basis of the whole surface area of the bread.

25. The process as claimed in claim 23, wherein the bread is prepared by using a dough comprising a cereal flour having an amount of crude protein of 10% by weight or more.

26. The process as claimed in claim 23, wherein the bread is prepared by using a dough comprising a cereal flour, and from 2 to 30 parts by weight, per 100 parts by weight of the cereal flour, of a fat and/or oil having a melting point of from 25° to 50° C. and a solid fat content of from 5 to 70% by weight at 10° C., from 5 to 60% by weight at 25° C. and 25% by weight or less at 35° C.

27. The process as claimed in claim 23, wherein the bread is prepared by using a dough comprising a cereal flour and from 0.5 to 20 parts by weight, calculated in terms of the amount of solid matters and per 100 parts by weight of the cereal flour, of gluten protein.

28. The process as claimed in claim 23, wherein the bread is prepared by using a dough comprising a cereal flour and from 0.5 to 20 parts by weight, calculated in terms of the amount of solid matters and per 100 parts by weight of the cereal flour, of egg white.

29. The process as claimed in claim 23, wherein the bread is prepared by using a dough comprising a cereal flour and from 0.1 to 10 parts by weight, calculated in terms of the amount of solid matters and per 100 parts by weight of the cereal flour, of a lipoprotein.

30. The process as claimed in claim 23, wherein the bread is prepared by using a dough comprising a cereal flour and from 10 to 20,000 activity units, per kg of the cereal flour, of at least one oxidase selected from the group consisting of peroxidases, glucose oxidases, polyphenol oxidases, transglutaminases and lipoxygenases.

31. The process as claimed in claim 22, wherein the cereal flour comprises wheat flour.

* * * * *

UNITED STATES PATENT AND TRADEMARK OFFICE
CERTIFICATE OF CORRECTION

PATENT NO. : 5,846,585
DATED : December 8, 1998
INVENTOR(S) : Hisao OHMURA et al.

It is certified that error appears in the above-identified patent and that said Letters Patent is hereby corrected as shown below:

On the title page, item [30] the second Foreign Application Priority Data date should be:

--Oct. 3, 1995 [JP] Japan ..............7-256501--

Signed and Sealed this

Eleventh Day of May, 1999

Attest:

Q. TODD DICKINSON

*Attesting Officer*   Acting Commissioner of Patents and Trademarks